United States Patent
Takiguchi et al.

(10) Patent No.: US 10,155,873 B2
(45) Date of Patent: Dec. 18, 2018

(54) ULTRAVIOLET-CURABLE COMPOSITION AND RECORDED MATTER

(71) Applicant: Seiko Epson Corporation, Tokyo (JP)

(72) Inventors: Hiroshi Takiguchi, Matsumoto (JP); Keitaro Nakano, Matsumoto (JP); Yoshiyuki Suzuki, Matsumoto (JP)

(73) Assignee: Seiko Epson Corporation (JP)

( * ) Notice: Subject to any disclaimer, the term of this patent is extended or adjusted under 35 U.S.C. 154(b) by 58 days.

(21) Appl. No.: 15/342,452

(22) Filed: Nov. 3, 2016

(65) Prior Publication Data

US 2017/0137653 A1    May 18, 2017

(30) Foreign Application Priority Data

Nov. 17, 2015  (JP) ................................. 2015-224702

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/38* | (2014.01) | |
| *C09D 11/101* | (2014.01) | |
| *B41J 2/01* | (2006.01) | |
| *C09D 11/322* | (2014.01) | |

(52) U.S. Cl.
CPC .................. *C09D 11/38* (2013.01); *B41J 2/01* (2013.01); *C09D 11/101* (2013.01); *C09D 11/322* (2013.01)

(58) Field of Classification Search
CPC ....... C09D 11/38; C09D 11/32; C09D 11/101; B41M 5/0023; B41J 2/01
USPC ........... 522/78, 74, 71, 1, 189, 184, 6; 520/1
See application file for complete search history.

(56) References Cited

U.S. PATENT DOCUMENTS

| | | | |
|---|---|---|---|
| 2009/0280302 A1 | 11/2009 | Fukumoto et al. | |
| 2011/0012955 A1 | 1/2011 | Tom et al. | |
| 2013/0196126 A1* | 8/2013 | Toyoda ................ | C09D 11/101 428/208 |
| 2014/0311779 A1* | 10/2014 | Furusho .................. | H01B 1/22 174/257 |

FOREIGN PATENT DOCUMENTS

| | | | |
|---|---|---|---|
| JP | 2005-059466 A | | 3/2005 |
| JP | 2009-057548 A | | 3/2009 |
| JP | 2009-291976 A | | 12/2009 |
| JP | 2011-521017 A | | 7/2011 |
| JP | 2012-241044 | * | 12/2012 |
| JP | 2012-241062 | * | 12/2012 |
| JP | 2012-254598 | * | 12/2012 |
| JP | 2012-255110 | * | 12/2012 |
| JP | 2013-001809 | * | 1/2013 |
| JP | 2013-227453 | * | 11/2013 |
| JP | 2015-089927 | * | 5/2015 |
| JP | 2015-089927 A | | 5/2015 |
| WO | WO-2009-128833 A1 | | 10/2009 |

OTHER PUBLICATIONS

Toyoda et al, JP 2012-241044 Machine Translation, Dec. 10, 2012 (Year: 2012).*
Toyoda et al, JP 2012-241062 Machine Translation, Dec. 10, 2012 (Year: 2012).*
Toyoda et al, JP 2012-254598 Machine Translation, Dec. 27, 2012 (Year: 2012).*
Toyoda et al, JP 2012-255110 Machine Translation Part 1, Dec. 27, 2012 (Year: 2012).*
Toyoda et al, JP 2012-255110 Machine Translation part 2, Dec. 27, 2012 (Year: 2012).*
Moriyama et al, JP 2013-001809 Machine Translation part 1, Jan. 7, 2013 (Year: 2013).*
Moriyama et al, JP 2013-001809 Machine Translation part 2, Jan. 7, 2013 (Year: 2013).*
Toyoda et al, JP 2013-227453 Machine Translation, Nov. 7, 2013 (Year: 2013).*
Takiguchi et al, JP 2015-089927 Machine Translation part 1, May 11, 2015 (Year: 2015).*
Takiguchi et al, JP 2015-089927 Machine Translation part 2, May 11, 2015 (Year: 2015).*

* cited by examiner

*Primary Examiner* — Jessica Whiteley
(74) *Attorney, Agent, or Firm* — Harness, Dickey & Pierce, P.L.C.

(57) ABSTRACT

An ultraviolet-curable composition is discharged with an ink jet method and includes a polymerizable compound; a metal powder; and a thixotropy suppressing agent, in which a relationship of $\eta2-\eta1 \le 3$ is satisfied between a viscosity $\eta1$ [mPa s] at a shearing speed of 1000 $\sec^{-1}$ and a viscosity $\eta2$ [mPa s] which is determined by measuring in a state where the shearing speed is 10 $\sec^{-1}$ after continuing to add shearing stress for 10 minutes at the shearing speed of 1000 $\sec^{-1}$.

18 Claims, No Drawings

ULTRAVIOLET-CURABLE COMPOSITION AND RECORDED MATTER

BACKGROUND

1. Technical Field

The present invention relates to an ultraviolet-curable composition and recorded matter.

2. Related Art

In the background art, as methods for manufacturing ornaments which have glossiness, metal plating, stamping printing using a metal foil, thermal transfer using a metal foil, and the like are used.

However, there is a problem with these methods in that fine pattern formation and application to curved portions are difficult.

On the other hand, a recording method in which a composition including a pigment or dye is applied to a recording medium with an ink jet method can be used. This method is excellent in the points that fine pattern formation is possible and that suitable application for recording on curved portions is also possible. In addition, in recent years, compositions which are cured when irradiated with ultraviolet rays (ultraviolet-curable compositions) have been used (for example, refer to JP-A-2009-57548) in order to obtain particularly excellent abrasion resistance, water resistance, solvent resistance, and the like.

However, in a case of simply applying a metal powder instead of a pigment or dye, there is a problem in that the liquid droplet discharge stability is poor with an ink jet method, discharge failures are easily generated, and it is not possible to sufficiently exhibit characteristics such as the natural glossiness of the metal.

SUMMARY

An advantage of some aspects of the invention is to provide an ultraviolet-curable composition which is excellent in discharge stability with an ink jet method and which is able to stably form a pattern (a printed portion) with excellent glossiness, and also to provide recorded matter which has a pattern (a printed portion) with excellent glossiness.

The invention has adopted the following.

According to an aspect of the invention, an ultraviolet-curable composition discharged by an ink jet method includes a polymerizable compound, a metal powder, and a thixotropy suppressing agent, in which a relationship of $\eta2-\eta1\leq3$ is satisfied between a viscosity $\eta1$ [mPa·s] at a shearing speed of 1000 sec$^{-1}$ and a viscosity $\eta2$ [mPa·s] obtained by measuring in a state where the shearing speed is set as 10 sec$^{-1}$ after continuously adding shearing stress for 10 minutes at the shearing speed of 1000 sec$^{-1}$.

Due to this, it is possible to provide an ultraviolet-curable composition which is excellent in discharge stability with an ink jet method and which is able to stably form a pattern (a printed portion) with excellent glossiness.

In the ultraviolet-curable composition according to the aspect of the invention, one type or two or more types selected from a group formed of a phosphoric acid-based dispersing agent, an alkyl amine-based dispersing agent, and fluorine-containing powder are preferably included as the thixotropy suppressing agent.

Due to this, it is possible to make the discharge stability of the ultraviolet-curable composition with an ink jet method particularly excellent. In addition, it is possible to make the glossiness, the abrasion resistance, and the like of the recorded matter particularly excellent while making the productivity of the recorded matter and the reliability of the recorded matter excellent.

In the ultraviolet-curable composition according to the aspect of the invention, the content ratio of the thixotropy suppressing agent in the ultraviolet-curable composition is preferably 0.2 mass % to 2.0 mass %.

Due to this, it is possible to make the discharge stability of the ultraviolet-curable composition with an ink jet method particularly excellent and make the productivity of the recorded matter and the reliability of the recorded matter particularly excellent, and it is also possible to make the glossiness, the abrasion resistance, and the like of the recorded matter particularly excellent.

In the ultraviolet-curable composition according to the aspect of the invention, the metal powder is preferably subjected to a surface treatment.

Due to this, it is possible to increase the dispersion stability of the metal powder (particles) in the ultraviolet-curable composition and it is possible to make the storage stability and the like of the ultraviolet-curable composition particularly excellent. In addition, a problem in that discharge failures with an ink jet method are easily generated occurs more remarkably in a case where the constituent particles of the metal powder are subjected to a surface treatment by a surface treatment agent; however, in the invention, it is possible to stably discharge the ultraviolet-curable composition with an ink jet method over a long period even in a case where the constituent particles of the metal powder are subjected to a surface treatment by a surface treatment agent. That is, the effects according to the aspect of the invention are more remarkably exhibited in a case where the constituent particles of the metal powder are subjected to a surface treatment by a surface treatment agent.

In the ultraviolet-curable composition according to the aspect of the invention, the surface treatment is preferably performed using a fluorine-based surface treatment agent.

Due to this, it is possible to make the storage stability of the ultraviolet-curable composition particularly excellent. In addition, in the recorded matter produced using the ultraviolet-curable composition, it is possible to more effectively exhibit characteristics such as the natural glossiness of the metal material which forms the metal powder. In addition, it is possible to make the abrasion resistance of a printed portion of the recorded matter particularly excellent and to more effectively prevent changes in appearance due to friction (for example, a decrease in the glossiness, a decrease in aesthetics (aesthetic appearance), and the like).

In the ultraviolet-curable composition according to the aspect of the invention, the fluorine-based surface treatment agent is preferably one type or two or more types selected from a group formed of a fluorine-based silane compound, a fluorine-based phosphate compound, a fluorine-substituted fatty acid, and a fluorine-based isocyanate compound.

Due to this, it is possible to make the discharge stability of the ultraviolet-curable composition with an ink jet method particularly excellent and to make the productivity of the recorded matter and the reliability of the recorded matter particularly excellent. In addition, it is possible to make the glossiness, the abrasion resistance, and the like of the recorded matter particularly excellent.

In the ultraviolet-curable composition according to the aspect of the invention, the average particle diameter of the metal powder is preferably 200 nm to 3.0 μm.

Due to this, it is possible to make the glossiness and sense of luxury of the recorded matter produced using the ultraviolet-curable composition particularly excellent. In addition, it is possible to make the storage stability and discharge stability of the ultraviolet-curable composition superior.

In the ultraviolet-curable composition according to the aspect of the invention, the metal powder preferably includes constituent particles where at least a surface is mainly formed of Al.

Due to this, it is possible to make the storage stability of the ultraviolet-curable composition particularly excellent. In addition, it is possible to make the glossiness and sense of luxury of the recorded matter particularly excellent while suppressing increases in the production cost of the recorded matter. In addition, Al naturally has particularly excellent glossiness among various types of metal materials; however, the present inventors discovered that the problem of decreases in the discharge stability with an ink jet method or the like occurs particularly easily in a case of trying to apply particles which are formed of Al to the ultraviolet-curable composition. In contrast, in the invention, it is possible to reliably prevent the occurrence of the problem described above even in a case of using particles which are formed of Al. That is, the effects according to the aspect of the invention are more remarkably exhibited in a case where the metal material which forms the metal powder is mainly formed of Al.

In the ultraviolet-curable composition according to the aspect of the invention, the constituent particles of the metal powder are preferably flaky.

Due to this, it is possible to effectively exhibit the natural glossiness or the like of the metal material which forms the metal powder even in the obtained recorded matter, and it is possible to make the glossiness and sense of luxury of a formed pattern (a printed portion) particularly excellent. In addition, the problem in the background art that the discharge stability with an ink jet method decreases occurs particularly remarkably in a case of using a metal powder which includes flaky particles; however, in the invention, it is possible to effectively prevent the occurrence of the problem described above even when the particles which form the metal powder are flaky. That is, the effects according to the aspect of the invention are more remarkably exhibited in a case where the particles which form the metal powder are flaky.

In the ultraviolet-curable composition according to the aspect of the invention, the average thickness of the constituent particles of the metal powder is preferably 10 nm to 80 nm.

Due to this, it is possible to make the glossiness and sense of luxury of the formed pattern (the printed portion) superior.

In The ultraviolet-curable composition according to the aspect of the invention, a monomer which has an alicyclic structure is preferably included as the polymerizable compound.

Due to this, it is possible to make the storage stability and discharge stability of the ultraviolet-curable composition particularly excellent, and it is also possible to make the glossiness and abrasion resistance of the printed portion of the recorded matter produced using the ultraviolet-curable composition particularly excellent.

In the ultraviolet-curable composition according to the aspect of the invention, the monomer having an alicyclic structure preferably includes one or more types selected from a group formed of tris(2-acryloyloxyethyl) isocyanurate, dicyclopentenyloxyethyl acrylate, adamantyl acrylate, γ-butyrolactone acrylate, N-vinylcaprolactam, N-vinylpyrrolidone, pentamethylpiperidyl acrylate, tetramethylpiperidyl acrylate, 2-methyl-2-adamantyl acrylate, 2-ethyl-2-adamantyl acrylate, mevalonic lactone acrylate, dimethylol tricyclodecane diacrylate, dimethylol dicyclopentane diacrylate, dicyclopentenyl acrylate, dicyclo pentanyl acrylate, isobornyl acrylate, cyclohexyl acrylate, acryloylmorpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

Due to this, it is possible to make the glossiness and sense of luxury of the recorded matter produced using the ultraviolet-curable composition superior. In addition, it is possible to make the storage stability and discharge stability of the ultraviolet-curable composition superior.

In the ultraviolet-curable composition according to the aspect of the invention, one type or two or more types selected from a group formed of phenoxyethyl acrylate, benzyl acrylate, 2-(2-vinyloxy ethoxy) ethyl acrylate, dipropylene glycol diacrylate, tripropylene glycol diacrylate, 2-hydroxy 3-phenoxypropyl acrylate, and 4-hydroxybutyl acrylate are preferably included as the polymerizable compound other than the monomer having an alicyclic structure.

Due to this, it is possible to make the reactivity of the ultraviolet-curable composition after discharge with the ink jet method particularly excellent while making the storage stability and discharge stability of the ultraviolet-curable composition particularly excellent, to make the productivity of the recorded matter particularly excellent, and to make the abrasion resistance and the like of the formed patterns particularly excellent.

The recorded matter according to another aspect of the invention is provided with a cured product of the ultraviolet-curable composition according to the aspect of the invention described above, and a recording medium.

Due to this, it is possible to provide recorded matter with excellent glossiness and which has a pattern (printed portion) where the generation of defects is prevented.

DESCRIPTION OF EXEMPLARY EMBODIMENTS

Detailed description will be given below of favorable embodiments of the invention.
Ultraviolet-Curable Composition
First, description will be given of the ultraviolet-curable composition according to an aspect of the invention.

The ultraviolet-curable composition of the invention includes a polymerizable compound which is polymerized by being irradiated with ultraviolet rays, and a metal powder.

Here, in the background art, metal plating, stamping printing using a metal foil, thermal transfer using a metal foil, and the like are used as methods for manufacturing ornaments which have glossiness.

However, there is a problem with these methods in that fine pattern formation and application to curved portions is difficult.

On the other hand, a recording method in which a composition including a pigment or dye is applied to a recording medium with an ink jet method can be used. This method is excellent in the points of fine pattern formation and that suitable application to curved portions is also possible. In addition, in recent years, compositions which are cured when irradiated with ultraviolet rays (ultraviolet-curable compositions) have been used in order to obtain particularly excellent abrasion resistance, water resistance, solvent resistance, and the like.

However, in a case of simply applying a metal powder instead of a pigment or dye, there is a problem in that the liquid droplet discharge stability is poor with an ink jet method, discharge failures are easily generated, and it is not possible to sufficiently exhibit characteristics such as the natural glossiness of the metal.

Thus, the present inventors completed the invention as a result of intensive research focusing particularly on the state of the ultraviolet-curable composition in an ink jet head for the purpose of solving the problem described above. That is, the ultraviolet-curable composition (an ultraviolet-curable ink jet composition) of the invention includes a polymerizable compound, metal powder, and a thixotropy suppressing agent, and satisfies a relationship of $\eta 2-\eta 1 \leq 3$ between a viscosity $\eta 1$ [mPa·s] at a shearing speed of 1000 sec$^{-1}$ and a viscosity $\eta 2$ [mPa·s] obtained by measuring in a state where the shearing speed is set as 10 sec$^{-1}$ after continuously adding shearing stress for 10 minutes at a shearing speed of 1000 sec$^{-1}$.

It may be considered that these excellent effects can be obtained for the reasons below. That is, although a large amount of stress (shearing stress) is added to the ultraviolet-curable composition in an ink jet head in an extremely short period, the amount of the liquid droplets which are discharged from nozzles of the ink jet head is extremely small. Accordingly, the ultraviolet-curable composition which is supplied in the ink jet head repeatedly and discontinuously receives a large amount stress (shearing stress) a plurality of times in synchronization with changes in the ink usage amount up to the discharge from the nozzles. Under these circumstances, particles of the metal powder which is included in the ultraviolet-curable composition are in a state of being rubbed together in the flow which is generated according to a flow path shape inside the ink jet head and the distance between the particles is often momentarily extremely close at places where the flow is fast and the shearing stress is large, such as inside the ink jet head. As a result, since a pigment subjected to a fluorine-based surface treatment has a property of tending to be stable in a state where the particles are aggregated and coarsened, the viscosity of the ultraviolet-curable composition easily increases inside the ink jet head due to the structural viscosity. As the result, in the ultraviolet-curable composition to which a metal powder is simply applied instead of a pigment or dye, discharge failures are easily generated since the originally exhibited ink viscosity greatly changes beyond the allowable range inside the ink jet head. Accordingly, a problem occurs in that it is not possible to sufficiently exhibit characteristics such as the natural glossiness of the metal due to it not being possible to uniformly form a coated film. In the invention, since including a thixotropy suppressing agent makes it possible for the pigment subjected to fluorine-based surface treatment to quickly dissolve and aggregate due to the effect of the thixotropy suppressing agent even after a large amount of shearing stress is added over a long period, it is possible to effectively prevent aggregation of the metal powder and increase the viscosity of the ultraviolet-curable composition, to maintain the discharge stability of the liquid droplets with the ink jet method over a long period, and to sufficiently exhibit characteristics such as the natural glossiness of a metal in the recorded matter produced using the ultraviolet-curable composition.

Here, in the invention, unless otherwise stated, the viscosity refers to a value which is measured on the basis of JIS Z8803 using a rotational viscometer (for example, manufactured by Anton Paar Japan K.K., Physica MCR-301 or the like). In addition, in the present specification, treatment or measurement for which the temperature is not particularly specified is performed at 25° C.

As described above, in the invention, it is sufficient if the relationship of $\eta 2-\eta 1 \leq 3$ is satisfied; however, it is preferable to satisfy a relationship of $\eta 2-\eta 1 \leq 2$, and it is more preferable to satisfy a relationship of $\eta 2-\eta 1 \leq 0.5$.

Due to this, the effects as described above are more remarkably exhibited.

In addition, in the ultraviolet-curable composition of the invention, the viscosity $\eta 0$ in a state (a default state) before shearing stress is added at a shearing speed of 1000 sec$^{-1}$ is preferably 4 mPa·s to 25 mPa·s, and more preferably 5 mPa·s to 20 mPa·s.

Due to this, it is possible to make the discharge stability of the ultraviolet-curable composition with an ink jet method particularly excellent. In addition, it is possible to more effectively prevent the ultraviolet-curable composition from being repelled, being excessively wet and spread, or the like on the recording medium.

In addition, the difference ($\eta 1-\eta 0$) between the viscosity $\eta 1$ [Pa·s] described above (the viscosity $\eta 1$ [mPa·s] at a shearing speed 1000 sec$^{-1}$) and the viscosity $\eta 0$ [Pa·s] in a state (a default state) before shearing stress is added at a shearing speed of 1000 sec$^{-1}$ is preferably 1.5 mPa·s or less, and more preferably 0.5 mPa·s or less.

For $\eta 0$ before shearing stress is added, it is possible to use a result which is measured beforehand by a vibration-type viscometer or the like in which large shearing stress is not added.

Due to this, it is possible to make the discharge stability of the ultraviolet-curable composition with an ink jet method particularly excellent and it is possible to make the productivity and reliability of the recorded matter particularly excellent.

In addition, it is preferable that the viscosity $\eta 1$ [mPa·s] described above (the viscosity $\eta 1$ [mPa·s] at a shearing speed 1000 sec$^{-1}$) and the viscosity $\eta 0$ [mPa·s] in a state (a default state) before shearing stress is added at a shearing speed of 1000 sec$^{-1}$ satisfy a relationship of $\eta 1/\eta 0 \leq 1.2$, and a relationship of $\eta 1/\eta 0 \leq 1.1$ is more preferably satisfied.

Due to this, it is possible to make the discharge stability of the ultraviolet-curable composition with an ink jet method particularly excellent and it is possible to make the productivity and reliability of the recorded matter particularly excellent.

Metal Powder

The ultraviolet-curable composition of the invention includes a metal powder.

Regarding the constituent particles of the metal powder, it is sufficient if a site (for example, the vicinity of a surface) which is seen externally is at least formed of a metal material and, for example, the entirety may be formed of a metal material, or there may be a base portion which is formed of a non-metal material and a coated film which is formed of a metal material which covers the base portion. In addition, a surface treatment layer may be provided by a surface treatment agent with respect to base particles where a region which includes at least the vicinity of the surface is formed of the metal material.

In addition, it is possible to use a single metal, various types of alloys, or the like as the metal material which forms the constituent particles of the metal powder; however, the metal material is preferably mainly formed of Al.

Al is a material with a low specific gravity (2.70 g/cm$^2$) compared to iron or the like and it is possible to make the sedimentation speed of the metal powder in the ultraviolet-curable composition particularly slow, and to make the storage stability of the ultraviolet-curable composition particularly excellent.

In addition, it is possible to make the glossiness and sense of luxury of the recorded matter particularly excellent while suppressing increases in the production cost of the recorded matter. In addition, Al naturally has particularly excellent glossiness among various types of metal materials; however, the present inventors discovered that the problem of decreases or the like in the discharge stability with an ink jet method occurs particularly easily in a case of trying to apply particles which are formed of Al to the ultraviolet-curable composition. In contrast, in the invention, it is possible to reliably prevent the occurrence of the problem described above even in a case of using particles which are formed of Al. That is, the effects of the invention are more remarkably exhibited in a case where the metal material which forms the metal powder is mainly formed of Al.

The metal powder may be produced by any method; however, it is preferably obtained by forming a film which is formed of a metal material by a vapor phase film-forming method and then grinding the film. Due to this, it is possible to effectively express the natural glossiness or the like of the metal material in a pattern (a printed portion) which is formed using the ultraviolet-curable composition of the invention. In addition, it is possible to suppress variations in the characteristics between each of the particles. In addition, it is even possible to favorably produce a comparatively thin metal powder using this method.

In a case of producing a metal powder using this method, for example, it is possible to favorably produce the metal powder by forming (film-forming) a film which is formed of a metal material on a substrate. It is possible to use, for example, a plastic film such as polyethylene terephthalate or the like as the substrate. In addition, the substrate may have a releasing agent layer on the film-forming surface.

In addition, the grinding is preferably performed by applying ultrasonic vibration to the film in a liquid. Due to this, it is possible to easily and reliably obtain a metal powder with the particle diameter which will be described below and to suppress the generation of variations in the size, shape, and characteristics between each of the particles.

In addition, as the liquid in a case of grinding with the above method, it is possible to suitably use alcohols such as methanol, ethanol, propanol, and butanol, hydrocarbon-based compounds such as n-heptane, n-octane, decane, dodecane, tetradecane, toluene, xylene, cymene, durene, indene, dipentene, tetrahydronaphthalene, decahydronaphthalene, and cyclohexylbenzene, ether-based compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl) ether, and p-dioxane, and polar compounds such as propylene carbonate, γ-butyrolactone, N-methyl-2-pyrrolidone, N,N-dimethylformamide (DMF), N,N-dimethylacetamide (DMA), dimethyl sulfoxide, cyclohexanone, and acetonitrile. Using the liquid makes it possible to make the productivity of the metal powder particularly excellent while preventing unwanted oxidization or the like of the metal powder and also to make the variations in the size, shape, and characteristics between each of the particles particularly small.

Description will be given below of a case where the constituent particles of the metal powder are particles where base particles (base particles where a region which includes at least the vicinity of the surface is formed of a metal material) are subjected to a surface treatment by a surface treatment agent.

The surface treatment agent has a function of increasing the dispersion stability of the metal powder (particles) in the ultraviolet-curable composition.

In addition, as long as surface treatment is carried out such that surface energy of the metal powder is decreased, even in a case of using a polymerizable compound with a low surface tension as the constituent material of the ultraviolet-curable composition, it is possible to reliably more favorably array (carry out leafing) the metal powder in the vicinity of the outer surface of the printed portion in the recorded matter produced using the ultraviolet-curable composition and to more effectively exhibit characteristics such as the natural glossiness of the metal material which forms the metal powder. Therefore, the range of the options for the polymerizable compound widens and it is possible to easily adjust the characteristics of the ultraviolet-curable composition or the characteristics of the recorded matter produced using the ultraviolet-curable composition (for example, the viscosity and the storage stability of the ultraviolet-curable composition, the abrasion resistance of the recorded matter, or the like) without sacrificing the natural glossiness of the metal material. On the other hand, the problem that discharge failures are easily generated with the ink jet method occurs remarkably when the constituent particles of the metal powder are subjected to a surface treatment by a surface treatment agent; however, in the invention, it is possible to stably discharge the ultraviolet-curable composition with an ink jet method over a long period even in a case where the constituent particles of the metal powder are subjected to a surface treatment by a surface treatment agent. That is, the effects of the invention are more remarkably exhibited in a case where the constituent particles of the metal powder are subjected to a surface treatment by a surface treatment agent.

As the surface treatment agent, it is possible to use, for example, a short chain compound which has an alkyl group which may have a substituent group with 2 to 4 carbon atoms, a long chain compound which has an alkyl group which may have a substituent group with 8 to 20 carbon atoms, a silane compound, a phosphate compound, a carboxylic acid compound, an isocyanate compound, and the like.

In a case where the alkyl group of the short chain compound and/or the alkyl group of the long chain compound has a substituent group, examples of the substituent group include a halogen group such as a fluoro group, a chloro group, or a bromo group, a hydroxyl group, and the like.

As a silane compound, it is possible to use a compound which has a structure in which hydrogen atoms and/or hydrocarbon groups (including ones in which some or all of the hydrogen atoms are substituted by other atoms or an atomic group) are directly bonded to silicon atoms.

In more detail, as the silane compound, it is possible to use, for example, silicon hydride ($Si_nH_{2n+2}$ (here, n is an integer of 1 or more)), $H_aSiR_{(4-a)}$ (here, R is a hydrocarbon group which may have a substituent group and a is an integer of 1 to 4), and the like.

As a phosphate compound, it is possible to use, for example, a compound (a long chain alkyl-based phosphate compound) which has at least one alkyl group with 6 or more carbon atoms in a molecule.

In particular, the phosphate compound (a long chain alkyl-based phosphate compound) preferably has a chemical structure which is represented by Formula (1) described below.

$$POR_n(OH)_{3-n} \quad (1)$$

(in formula (1), R is $CH_3(CH_2)_m$—, $CH_3(CH_2)_m(CH_2O)_l$—, $CH_3(CH_2)_m(CH_2CH_2O)_l$—, or $CH_3(CH_2)_mO$—, n is an integer of 1 to 3, m is an integer of 5 to 19, and l is an integer of 2 to 20).

Due to this, it is possible to make the storage stability of the ultraviolet-curable composition particularly excellent and to make the glossiness and abrasion resistance of the printed portion of the recorded matter produced using the ultraviolet-curable composition particularly excellent.

In Formula (1), m is preferably an integer of 5 to 19, and more preferably an integer of 7 to 17. Due to this, the effects as described above are more remarkably exhibited.

In addition, in Formula (1), l is preferably an integer of 2 to 20, and more preferably an integer of 4 to 16. Due to this, the effects as described above are more remarkably exhibited.

As a carboxylic acid, it is possible to use a compound (fatty acid) which has a hydrocarbon group and a carboxyl group. Specific examples of the compound include decanoic acid, tetradecanoic acid, octadecanoic acid, cis-9-octadecenoic acid, and the like.

As an isocyanate compound, it is possible to use a compound which has a partial structure which is represented by —N═C═O. The compound modifies a surface of the particles (the base particles) as a compound which has a partial structure which is represented by —NHCOO— by reacting with the metal material which forms the metal powder (base particles); however, the force of a hydrogen bond acts in the partial structure which is represented by —NHCOO—. For this reason, it is possible to carry out fine surface treatment on the surfaces of the particles and to remarkably exhibit the effects as described above.

As an isocyanate compound, it is possible to use a compound which has at least one isocyanate group in a molecule.

As the isocyanate compound, it is possible to use, for example, a compound which has a chemical structure which is represented by Formula (2) described below.

$$RNCO \quad (2)$$

(in Formula (2), R is $CH_3(CH_2)_m$— and m is an integer of 2 to 18).

In Formula (2), m is preferably an integer of 3 to 14 and more preferably an integer of 4 to 12.

For example, a fluorine-based compound (a fluorine-based surface treatment agent) may be used as a surface treatment agent.

Due to this, it is possible to make the dispersion stability and chemical stability of the metal powder in the ultraviolet-curable composition particularly excellent and to make the storage stability of the ultraviolet-curable composition particularly excellent. In addition, in the recorded matter produced using the ultraviolet-curable composition, it is possible to favorably arrange the metal powder (metal powder which is subjected to a surface treatment by a fluorine-based surface treatment agent) in the vicinity of the outer surface of the printed portion and to more effectively exhibit characteristics such as the natural glossiness of the metal material which forms the metal powder. In addition, it is possible to make the abrasion resistance of a printed portion of the recorded matter particularly excellent and to more effectively prevent changes in appearance due to friction (for example, a decrease in the glossiness, a decrease in aesthetics (aesthetic appearance), and the like). In addition, by the particles which form the metal powder being subjected to a surface treatment by a fluorine-based surface treatment agent, even in a case of using a polymerizable compound with a low surface tension as a constituent material of the ultraviolet-curable composition, it is possible to more favorably array (carry out leafing) the metal powder in the vicinity of the outer surface of the printed portion in the recorded matter produced using the ultraviolet-curable composition and to more effectively exhibit characteristics such as the natural glossiness of the metal material which forms the metal powder. Accordingly, the range of the options for the polymerizable compound widens and it is possible to easily adjust the characteristics of the ultraviolet-curable composition or the characteristics of the recorded matter produced using the ultraviolet-curable composition (for example, the viscosity and the storage stability of the ultraviolet-curable composition, the abrasion resistance of the recorded matter, or the like) without sacrificing the natural glossiness of the metal material.

The fluorine-based compound (the fluorine-based surface treatment agent) preferably has a perfluoro alkyl structure.

Due to this, it is possible to make the storage stability of the ultraviolet-curable composition superior and to make the glossiness and abrasion resistance of the printed portion of the recorded matter produced using the ultraviolet-curable composition superior.

In addition, it is sufficient if the fluorine-based compound (the fluorine-based surface treatment agent) includes at least one fluorine atom in a molecule and more specific examples thereof include a compound (a fluorine-based short chain compound, a fluorine-based long chain compound, a fluorine-based silane compound, a fluorine-based phosphate compound, a fluorine-substituted fatty acid, a fluorine-based isocyanate compound, and the like) which has a structure in which at least some of the hydrogen atoms of the short chain compound, the long chain compound, the silane compound, the phosphate compound, the carboxylic acid, and the isocyanate compound described above are substituted by fluorine atoms or the like.

The effects as described above are more remarkably exhibited by using these compounds as the surface treatment agent. In particular, it is possible to more effectively decrease the surface free energy of the constituent particles of the metal powder, the difference of the interface energy with a polymerizable compound is made larger and the hydrophobic interaction acts more strongly, and it is possible to more effectively array the metal powder on the surface of the recorded matter. As the result, it is possible to make the glossiness of the recorded matter particularly excellent.

Among these, in a case of using the fluorine-based silane compound, the recorded matter produced using the ultraviolet-curable composition exhibits particularly excellent durability and weather resistance and it is possible to maintain the hardness of the film over a longer period.

In addition, since the phosphate compound surface treatment agent is strong against acid, in a case of using a fluorine-based phosphate compound, the recorded matter produced using the ultraviolet-curable composition exhibits excellent durability and weather resistance even under an acidic environment.

In addition, in a case of using a fluorine-substituted fatty acid (a fluorine-based fatty acid), it is possible to more effectively perform the surface treatment with respect to the base particles which are formed of noble metals such as gold, silver, and platinum, copper, aluminum, and the like and, since it is possible to form a film (a surface treatment layer) of which a functional group is small and the crystallinity is high, it is possible to effectively decrease the surface free energy. As the result, it is possible to effectively line up smaller particles on the surface of the recorded matter and to further improve the abrasion resistance.

In addition, in a case of using a fluorine-based isocyanate compound, since it is possible to carry out a finer surface treatment with respect to the base particles and to strengthen the bonding force with the base particles and, the durability of the metal powder is increased, it is possible to maintain the abrasion resistance over a longer period.

The fluorine-based silane compound preferably has the chemical structure which is represented by Formula (3) described below.

$$R^1 SiX^1_a R^2_{(3-a)} \qquad (3)$$

(in Formula (3), $R^1$ represents a hydrocarbon group in which some or all of the hydrogen atoms are substituted by fluorine atoms, $X^1$ represents a hydrolyzable group, an ether group, a chloro group, or a hydroxyl group, $R^2$ represents an alkyl group with 1 to 4 carbon atoms, and a is an integer of 1 to 3).

Due to this, it is possible to make the storage stability of the ultraviolet-curable composition particularly excellent and to make the glossiness and abrasion resistance of the printed portion of the recorded matter produced using the ultraviolet-curable composition particularly excellent.

Examples of $R^1$ in formula (3) include an alkyl group, an alkenyl group, an aryl group, an aralkyl group and the like in which some or all of the hydrogen atoms of these groups are substituted with fluorine atoms, furthermore, at least a part of the hydrogen atoms included in the molecular structure (hydrogen atoms which are not substituted with fluorine atoms) may be substituted with an amino group, a carboxyl group, a hydroxyl group, a thiol group, or the like, or an aromatic ring such as a heteroatom such as —O—, —S—, —NH—, or —N= or benzene may be included in the carbon chain. Specific examples of $R^1$ include a phenyl group, a benzyl group, a phenethyl group, a hydroxyphenyl group, a chlorophenyl group, an amino phenyl group, a naphthyl group, an anthranilic group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, a n-propyl group, an isopropyl group, a n-butyl group, an isobutyl group, a sec-butyl group, a tert-butyl group, an octadecyl group, a n-octyl group, a chloromethyl group, a methoxyethyl group, a hydroxyethyl group, an amino ethyl group, a cyano group, a mercaptopropyl group, a vinyl group, an allyl group, an acryloxyethyl group, a methacryloxy ethyl group, a glycidoxypropyl group, an acetoxy group, and the like in which some or all of the hydrogen atoms of these groups are substituted with fluorine atoms.

Examples of the fluorine-based silane compound which has a perfluoro alkyl structure ($C_nF_{2n+1}$) include the compound represented by Formula (4) below.

$$C_nF_{2n+1}(CH_2)_m SiX^1_a R^2_{(3-a)} \qquad (4)$$

(in Formula (4), $X^1$ represents a hydrolyzable group, an ether group, a chloro group, or a hydroxyl group, $R^2$ represents an alkyl group with 1 to 4 carbon atoms, n is an integer of 1 to 14, m is an integer of 2 to 6, and a is an integer of 1 to 3).

Specific examples of the compound which has the structure include $CF_3$—$CH_2CH_2$—$Si(OCH_3)_3$, $CF_3$ $(CF_2)_3$—$CH_2CH_2$—$Si(OCH_3)_3$, $CF_3$ $(CF_2)_5$—$CH_2CH_2$—$Si(OCH_3)_3$, $CF_3$ $(CF_2)_5$—$CH_2CH_2$—$Si(OC_2H_5)_3$, $CF_3$ $(CF_2)_7$—$CH_2CH_2$—$Si(OCH_3)_3$, $CF_3$ $(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3$ $(CF_2)_7$—$CH_2CH_2$—$Si(CH_3)(OCH_3)_2$, $CF_3$ $(CF_2)_8$—$CH_2CH_2$—$Si(CH_3)(OC_2H_5)_2$, $CF_3$ $(CF_2)_8$—$CH_2CH_2$—$Si(C_2H_5)(OC_2H_5)_2$, and the like.

In addition, as the fluorine-based silane compound, it is also possible to use a compound which has a perfluoro alkyl ether structure ($C_nF_{2n+1}O$) instead of the perfluoro alkyl structure ($C_nF_{2n+1}$) described above.

Examples of the fluorine-based silane compound which has a perfluoro alkyl ether structure ($C_nF_{2n+1}O$) include the compound represented by Formula (5).

$$C_pF_{2p+1}O(C_pF_{2p}O)_r(CH_2)_m SiX^1_a R^2_{(3-a)} \qquad (5)$$

(in Formula (5), $X^1$ represents a hydrolyzable group, an ether group, a chloro group, or a hydroxyl group, $R^2$ represents an alkyl group with 1 to 4 carbon atoms, p is an integer of 1 to 4, r is an integer of 1 to 10, m is an integer of 2 to 6, and a is an integer of 1 to 3).

Specific examples of the compound having such a structure include $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si(OCH_3)_3$, $CF_3O(C_4F_9O)_5$—$CH_2CH_2$—$Si(CH_3)(OC_2H_5)_2$, $CF_3O(C_3F_6O)_4$—$CH_2CH_2$—$Si(C_2H_5)(OCH_3)_2$, and the like.

As the fluorine-based phosphate compound, it is possible to use a phosphate compound which has at least one fluorine atom in the molecule.

In particular, the fluorine-based phosphate compound preferably has the chemical structure which is represented by Formula (6) described below.

$$POR_n(OH)_{3-n} \qquad (6)$$

(in formula (6), R is $CF_3(CF_2)_m$—, $CF_3(CF_2)_m(CH_2)_l$—, $CF_3$ $(CF_2)_m(CH_2O)_l$—, $CF_3$ $(CF_2)_m(CH_2CH_2O)_l$—, $CF_3$ $(CF_2)_mO$—, or, $CF_3(CF_2)_m(CH_2)_lO$—, n is an integer of 1 to 3, m is an integer of 2 to 18, and l is an integer of 1 to 18).

Due to this, it is possible to make the storage stability of the ultraviolet-curable composition particularly excellent and to make the glossiness and abrasion resistance of the printed portion of the recorded matter produced using the ultraviolet-curable composition particularly excellent.

In Formula (6), m is preferably an integer of 3 to 14, and more preferably an integer of 4 to 12. Due to this, the effects as described above are more remarkably exhibited.

In addition, in Formula (6), l is preferably an integer of 1 to 14, and more preferably an integer of 1 to 10. Due to this, the effects as described above are more remarkably exhibited.

As the fluorine-substituted fatty acid (the fluorine-based fatty acid), it is possible to use a fatty acid which has at least one fluorine atom in the molecule.

Examples of the fluorine-substituted fatty acid include $CF_3$—$CH_2CH_2$—$COOH$, $CF_3$ $(CF_2)_3$—$CH_2CH_2$—$COOH$, $CF_3(CF_2)_5$—$CH_2CH_2$—$COOH$, $CF_3$ $(CF_2)_6$—$CH_2CH_2$—$COOH$, $CF_3$ $(CF_2)_7$—$CH_2CH_2$—$COOH$, $CF_3(CF_2)_9$—$CH_2CH_2$—$COOH$, and esters thereof and the like, among them, $CF_3(CF_2)_5$—$CH_2CH_2$—$COOH$ is preferable.

Due to this, since it is possible to make a stronger bond with silicon or the metal atoms such as aluminum, magnesium, and titanium which form the base particles by a dehydration reaction due to heating and to form a fine film, it is possible to effectively decrease the surface energy of the particles.

As the fluorine-based isocyanate compound, it is possible to use a compound which has at least one fluorine atom and at least one isocyanate group in a molecule.

As the fluorine-based isocyanate compound, it is possible to use a compound which has the chemical structure which is represented by Formula (7) described below.

$$RfNCO \tag{7}$$

(in Formula (7), Rf is $CF_3(CF_2)_m-$ or $CF_3(CF_2)_m(CH_2)_l-$, m is an integer of 2 to 18, and l is an integer of 1 to 18).

Due to this, it is possible to make the storage stability of the ultraviolet-curable composition particularly excellent. In addition, in the recorded matter produced using the ultraviolet-curable composition, it is possible to more favorably array (carry out leafing) the metal powder in the vicinity of the outer surface of the printed portion to make the glossiness of the printed portion of the produced recorded matter particularly excellent. In addition, it is possible to make the abrasion resistance of the printed portion of the produced recorded matter particularly excellent.

In Formula (7), m is preferably an integer of 3 to 14 and more preferably an integer of 4 to 12. Due to this, the effects as described above are more remarkably exhibited.

In addition, in Formula (7), l is preferably an integer of 1 to 14 and more preferably an integer of 1 to 10. Due to this, the effects as described above are more remarkably exhibited.

In addition, the metal powder may be subjected to a surface treatment by a plurality of types of surface treatment agents. In this case, the surface treatment by a plurality of types of surface treatment agents may be carried out on the same particles or the metal powder may include a plurality of types of particles subjected to a surface treatment by different surface treatment agents.

The surface treatment agent described above may directly treat the base particles; however, the treatment by the surface treatment agent is preferably performed with respect to the base particles after the base particles are processed with an acid or a base. Due to this, it is possible to more reliably carry out modification by chemical bonding with the base particle surface using the surface treatment agent and to more effectively exhibit the effects as described above. As an acid, it is possible to use, for example, proton acids such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid. Among these, hydrochloric acid, phosphoric acid, and acetic acid are favorable. On the other hand, as a base, it is possible to use, for example, sodium hydroxide, potassium hydroxide, calcium hydroxide, and the like. Among these, sodium hydroxide and potassium hydroxide are favorable.

In a case of carrying out a plurality of types of surface treatments on the same particles, the surface treatments may be performed by being divided into a plurality of steps which correspond to each of the surface treatment agents or the surface treatments may be performed in the same step by a plurality of types of surface treatment agents.

In addition, for example, the surface treatment of the base particles using the surface treatment agent may be performed by including the surface treatment agent in a liquid when grinding a film made of a metal formed by the vapor phase film-forming method in a liquid to form the base particles as described above.

Due to this, it is possible to advance the surface treatment along with the forming of the base particles of which the size uniformity is excellent, it is possible to quickly perform the surface treatment on a clean surface which is exposed due to the grinding, and it is possible to make the quality and productivity of the metal powder and the ultraviolet-curable composition particularly excellent. In addition, it is possible to carry out the surface treatment on each site of the metal powder with high uniformity. In addition, in a case of using the agents described above as the surface treatment agent (particularly in a case of using a fluorine-based phosphate compound), by the aggregation of the base particles subjected to the surface treatment being appropriately inhibited, the fluidity of the liquid in which the base particles are dispersed is increased, it is possible to more effectively grind the film, it is possible to more efficiently obtain a metal powder which satisfies the particle diameter conditions which will be described below, and it is possible to make the quality and productivity of the metal powder and the ultraviolet-curable composition superior.

In a case of carrying out a plurality of types of surface treatments on the same particles, the surface treatments may be performed by being divided into a plurality of steps which correspond to each of the surface treatment agents or the surface treatments may be performed in the same step by a plurality of types of surface treatment agents.

The particles which form the metal powder may take any shape such as a sphere, a spindle, or a needle, and are preferably flaky.

Due to this, it is possible to arrange the metal powder such that the main surfaces of the particles are along the surface shape of the recording medium on the recording medium to which the ultraviolet-curable composition is added, it is possible to effectively exhibit the natural glossiness or the like of the metal material which forms the metal powder even in the obtained recorded matter, and it is possible to make the glossiness and sense of luxury of the formed pattern (a printed portion) particularly excellent. In addition, in a case where the metal powder is subjected to the surface treatment described above, it is possible to make the abrasion resistance of the recorded matter particularly excellent. In addition, the problem in the background art that the discharge stability with an ink jet method decreases occurs particularly remarkably in a case of using a metal powder which includes flaky particles; however, in the invention, it is possible to effectively prevent the occurrence of the problem described above even when the particles which form the metal powder are flaky. That is, the effects of the invention are more remarkably exhibited in a case where the particles which form the metal powder are flaky.

In the invention, flaky refers to a shape of which an area when observed from a predetermined angle (when viewed in plan) is larger than an area when observed from an angle which is orthogonal with the observing direction as a flat shape, a curved plane, or the like, and, in particular, the ratio $(S_1/S_0)$ with respect to an area $S_1$ [$\mu m^2$] when observed (when viewed in plan view) from a direction in which the projection area is the maximum and an area $S_0$ [$\mu m^2$] when observed from a direction in which an area when observed in the direction which orthogonal to the observing direction is the maximum is preferably 2 or more, more preferably 5 or more, and even more preferably 8 or more. As the value, it is possible to, for example, adopt the average value of the calculated values for any 10 arbitrary particles by observing the particles.

In a case where the particles which form the metal powder are flaky, the average thickness of the particles is preferably 10 nm to 80 nm, and more preferably 20 nm to 70 nm.

For example, the ratio ($S_1/S_0$) and the thickness can be observed using a transmission electron microscope and a scanning electron microscope, and specific examples include a transmission electron microscope (TEM, JOEL JEM-2000EX), a field emission scanning electron microscope (FE-SEM, Hitachi S-4700), a scanning transmission electron microscope (STEM, "HD-2000" manufactured by Hitachi High-Technologies Corporation) and the like. The thickness means an average thickness and is an average value obtained such that the measurement is performed 10 times.

Due to this, the effects due to the particles described above being flaky are more remarkably exhibited.

The average particle diameter ($D_{50}$) of the metal powder is preferably 200 nm to 3.0 µm, more preferably 250 nm to 640 nm, and even more preferably 300 nm to 600 nm.

Due to this, it is possible to make the glossiness and sense of luxury of the recorded matter produced using the ultraviolet-curable composition particularly excellent. In addition, it is possible to make the storage stability and discharge stability of the ultraviolet-curable composition superior.

Here, in the invention, the average particle diameter refers to the median diameter of volume distribution where the particle dispersing liquid is measured using a laser diffraction scattering method and, in a case where a large number of measurement results are represented as the accumulation of the presence ratios for each size (particle diameter), the average particle diameter is the size (the volume average particle diameter) of the particles which exhibits exactly 50% of the central value in the accumulation. Examples of the measurement device include a laser diffraction scattering particle size analyzer, Microtrack MT-3000 (manufactured by Nikkiso Co., Ltd.). The volume average particle diameters (D50) in the below-described Examples are values measured by the above-described Microtrack MT-3000.

The particle diameter ($D_{10}$) at a volume accumulation distribution ratio of 10% from the fine particle side of the metal powder is preferably 100 nm to 1.1 µm, more preferably 150 nm to 400 nm, and even more preferably 180 nm to 350 nm.

Due to this, it is possible to make the particle distribution of the metal powder sharper and to make the discharge stability of the ultraviolet-curable composition with an ink jet method particularly excellent.

The particle diameter ($D_{90}$) at a volume accumulation distribution ratio of 90% from the fine particle side of the metal powder is preferably 300 nm to 4.0 µm, more preferably 400 nm to 1300 nm, and even more preferably 500 nm to 1100 nm.

Due to this, it is possible to make the particle distribution of the metal powder sharper and to make the discharge stability of the ultraviolet-curable composition with an ink jet method particularly excellent.

The half-value width in the particle distribution of the metal powder (the distance between D25 and D75) is preferably 0.50 µm or less, more preferably 0.45 µm or less, and even more preferably 0.30 µm or less.

Due to this, it is possible to make the particle distribution of the metal powder sharper and to make the discharge stability of the ultraviolet-curable composition with an ink jet method particularly excellent.

The content ratio of the metal powder in the ultraviolet-curable composition is preferably 0.9 mass % to 29 mass %, and more preferably 1.2 mass % to 19.3 mass %.

Due to this, it is possible to satisfy both the glossiness and the abrasion resistance of the printed portion which is formed using the ultraviolet-curable composition at a higher level. In addition, it is possible to make the storage stability of the ultraviolet-curable composition and the discharge stability of the ultraviolet-curable composition with an ink jet method particularly excellent.

Polymerizable Compound

The polymerizable compound is a component which is polymerized by being irradiated with ultraviolet rays to be cured. Including the component makes it possible to make the abrasion resistance, water resistance, solvent resistance, and the like of the recorded matter produced using the ultraviolet-curable composition excellent.

The polymerizable compound is in liquid form and preferably functions as a dispersing medium which disperses the metal powder in the ultraviolet-curable composition.

Due to this, since it is not necessary to separately use a dispersing medium which is removed (evaporated) in the process of producing the recorded matter and it is not necessary to provide a step of removing the dispersing medium even when producing the recorded matter, it is possible to make the productivity of the recorded matter particularly excellent. In addition, since it is not necessary to use a dispersing medium which is generally used as an organic solvent, it is possible to prevent the occurrence of the problem of volatile organic compounds (VOC). In addition, by including a polymerizable compound, it is possible to make the adhesiveness of the printed portion which is formed using the ultraviolet-curable composition with respect to various types of recording media (substrates) excellent. That is, by including a polymerizable compound, the ultraviolet-curable composition is excellent in terms of corresponding to the media.

It is sufficient if the polymerizable compound is a component which is polymerized by being irradiated with ultraviolet rays, and it is possible to use, for example, various types of monomers, various types of oligomers (which include dimers, trimers, and the like), and the like; however, the ultraviolet-curable composition preferably includes at least a monomer component as a polymerizable compound. Since a monomer is generally a component with low viscosity compared to an oligomer component or the like, it is advantageous in terms of making the discharge stability or the like of the ultraviolet-curable composition particularly excellent.

In particular, the ultraviolet-curable composition preferably includes a monomer which has an alicyclic structure as a polymerizable compound.

By including a monomer which has an alicyclic structure along with the thixotropy suppressing agent, it is possible to make the storage stability and discharge stability of the ultraviolet-curable composition particularly excellent and it is also possible to make the glossiness and abrasion resistance of the printed portion of the recorded matter produced using the ultraviolet-curable composition particularly excellent.

Examples of the monomer having an alicyclic structure include tris(2-(meth)acryloyloxyethyl) isocyanurate, dicyclopentenyloxyethyl (meth)acrylate, adamantyl (meth)acrylate, γ-butyrolactone (meth)acrylate, N-vinylcaprolactam, N-vinylpyrrolidone, pentamethylpiperidyl (meth)acrylate, tetramethyl piperidyl (meth)acrylate, 2-methyl-2-adamantyl (meth)acrylate, 2-ethyl-2-adamantyl (meth)acrylate, mevalonic lactone (meth)acrylate, dimethylol tricyclodecane di(meth)acrylate, dimethylol dicyclopentane di(meth)acrylate, dicyclopentenyl (meth)acrylate, dicyclopentanyl (meth)acrylate, isobornyl (meth)acrylate, cyclohexyl (meth)acrylate, (meth)acryloylmorpholine, tetrahydrofurfuryl (meth)acrylate, phenyl glycidyl ether (meth)acrylate, EO-modified hydrogenated bisphenol A di(meth)acrylate, di(meth)acrylated isocyanurate, tri(meth)acrylated isocyanurate and the like, and preferably include one type or two or more types selected from a group formed of tris(2-acryloyloxyethyl) isocyanurate, dicyclopentenyloxy ethyl acrylate, adamantyl acrylate, γ-butyrolactone acrylate, N-vinylcaprolactam, N-vinylpyrrolidone, pentamethylpiperidyl acrylate, tetramethyl piperidyl acrylate, 2-methyl-2-adamantyl acrylate, 2-ethyl-2-adamantyl acrylate, mevalonic lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloylmorpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

Due to this, it is possible to make the glossiness and sense of luxury of the recorded matter produced using the ultraviolet-curable composition superior. In addition, by including the monomer along with a thixotropy suppressing agent, it is possible to make the storage stability and discharge stability of the ultraviolet-curable composition superior.

Among these, in a case of including one type or two or more types selected from a group formed of acryloylmorpholine, tetrahydrofurfuryl acrylate, γ-butyrolactone acrylate, N-vinylcaprolactam, and N-vinylpyrrolidone, it is possible to make the dispersion stability of the metal powder in the ultraviolet-curable composition superior, it is also possible to more favorably array the metal powder in the vicinity of the outer surface of the printed portion in the recorded matter produced using the ultraviolet-curable composition, and it is possible to make the glossiness of the obtained recorded matter superior. In addition, by including the monomer along with a thixotropy suppressing agent, it is possible to make the discharge stability of the ultraviolet-curable composition superior.

In addition, from the point of view of the curing speed of the ultraviolet-curable composition when irradiated with ultraviolet rays and further improvement of the productivity of the recorded matter, it is preferable to include one type or two or more types selected from a group formed of tris(2-acryloyloxyethyl) isocyanurate, dicyclopentenyloxyethyl acrylate, γ-butyrolactone acrylate, N-vinylpyrrolidone, dimethylol tricyclodecane diacrylate, dimethylol dicyclopentane diacrylate, dicyclopentenyl acrylate, dicyclopentanyl acrylate, acryloylmorpholine, and tetrahydrofurfuryl acrylate, and more preferably, acryloylmorpholine, and/or γ-butyrolactone acrylate, and even more preferably γ-butyrolactone acrylate.

In addition, in a case of including one type or two or more types selected from a group formed of cyclohexyl acrylate, tetrahydrofurfuryl acrylate, and benzyl acrylate, it is possible to make the flexibility of the printed portion which is formed by curing the ultraviolet-curable composition superior.

In addition, from the point of view of further improving the abrasion resistance of the printed portion which is formed by curing the ultraviolet-curable composition, it is preferable to include one type or two or more types selected from a group formed of tris(2-acryloyloxyethyl) isocyanurate, dicyclopentenyloxyethyl acrylate, adamantyl acrylate, γ-butyrolactone acrylate, N-vinylcaprolactam, N-vinylpyrrolidone, dimethylol tricyclodecane diacrylate, dimethylol dicyclopentane diacrylate, dicyclopentenyl acrylate, dicyclopentanyl acrylate, isobornyl acrylate, and acryloylmorpholine, and more preferably γ-butyrolactone acrylate, and/or, N-vinylcaprolactam.

In addition, in a case of including one type or two or more types selected from a group formed of γ-butyrolactone acrylate, N-vinylcaprolactam, N-vinylpyrrolidone, isobornyl acrylate, and tetrahydrofurfuryl acrylate, it is possible to more effectively prevent decreases in the glossiness or the like due to unwanted creases or the like being generated in the printed portion, which is formed by curing the ultraviolet-curable composition, by reducing the contraction rate when curing the ultraviolet-curable composition.

The content ratio of the monomer which has an alicyclic structure in the ultraviolet-curable composition is preferably 38 mass % to 90 mass %, more preferably 49 mass % to 88 mass %, and even more preferably 54 mass % to 85 mass %.

Due to this, the dispersion stability of the metal powder is particularly excellent, and excellent discharge stability is obtained over a long period. Here, the ultraviolet-curable composition may include two or more types of compounds as a monomer which has an alicyclic structure. In this case, the total content ratio is preferably a value within these ranges.

Regarding the monomer which has an alicyclic structure, the number of constituent atoms in the cyclic structure which is formed by a common bond is preferably 5 or more and more preferably 6 or more.

Due to this, it is possible to make the storage stability of the ultraviolet-curable composition particularly excellent.

As a monomer which has an alicyclic structure, the ultraviolet-curable composition preferably includes a monofunctional monomer (a monofunctional monomer which has a hetero ring which does not exhibit aromaticity) which includes a hetero atom in an alicyclic structure.

Due to this, the dispersion stability of the metal powder is particularly excellent, and excellent discharge stability is obtained over a long period. Examples of such monofunctional monomers include tris(2-(meth)acryloyloxyethyl) isocyanurate, γ-butyrolactone (meth)acrylate, N-vinylcaprolactam, N-vinylpyrrolidone, pentamethylpiperidyl (meth)acrylate, tetramethyl piperidyl (meth)acrylate, mevalonic lactone (meth)acrylate, (meth)acryloylmorpholine, tetrahydrofurfuryl (meth)acrylate, and the like.

The content ratio of the monofunctional monomer (a monofunctional monomer which includes a hetero atom in an alicyclic structure) in the ultraviolet-curable composition is preferably 8 mass % to 80 mass % and more preferably 13 mass % to 75 mass %.

Due to this, it is possible to favorably use the above for producing recorded matter which is provided with a pattern (a printed portion) in which curing contraction is suppressed, there is little scattering, and the glossiness is superior. Here, the ultraviolet-curable composition may include two or more types of compounds as the single functional monomer which includes a hetero atom in an alicyclic structure. In this case, the total content ratio is preferably a value within these ranges.

In the invention, the polymerizable compound which forms the ultraviolet-curable composition may include a monomer which does not have an alicyclic structure.

Examples of such monomers (monomers which do not have an alicyclic structure) include phenoxyethyl (meth)acrylate, benzyl (meth)acrylate, 2-(2-vinyloxyethoxy) ethyl (meth)acrylate, dipropylene glycol di(meth)acrylate, tripropylene glycol di(meth)acrylate, 2-hydroxy 3-phenoxypropyl (meth)acrylate, and 4-hydroxybutyl (meth)acrylate lauryl (meth)acrylate, 2-methoxyethyl (meth)acrylate, isooctyl (meth)acrylate, stearyl (meth)acrylate, 2-ethoxyethyl (meth)acrylate, 1H,1H,5H-octafluoropentyl (meth)acrylate, 2-hydroxyethyl (meth)acrylate, 2-hydroxypropyl (meth)acrylate, isobutyl (meth)acrylate, t-butyl (meth)acrylate, ethyl carbitol (meth)acrylate, 2,2,2-trifluoroethyl (meth)acrylate, 2,2,3,3-tetrafluoropropyl (meth)acrylate, methoxy triethylene glycol (meth)acrylate, PO-modified nonylphenol (meth)acrylate, EO-modified nonylphenol (meth)acrylate, EO-modified 2-ethylhexyl (meth)acrylate, phenoxy diethylene glycol (meth)acrylate, EO-modified phenol (meth)acrylate, EO-modified cresol (meth)acrylate, methoxy polyethylene glycol (meth)acrylate, dipropylene glycol (meth)acrylate, 2-n-butyl-2-ethyl-1,3-propanediol di(meth)acrylate, tetraethylene glycol di(meth)acrylate, 1,9-nonanediol di(meth)acrylate, 1,4-butanediol di(meth)acrylate, bisphenol A EO-modified di(meth)acrylate, 1,6-hexanediol di(meth)acrylate, polyethylene glycol 200 di(meth)acrylate, polyethylene glycol 300 di(meth)acrylate, neopentyl glycol hydroxypivalate di(meth)acrylate, 2-ethyl-2-butyl-propane diol di(meth)acrylate, polyethylene glycol 400 di(meth)acrylate, polyethylene glycol 600 di(meth)acrylate, polypropylene glycol di(meth)acrylate, PO-modified bisphenol A di(meth)acrylate, trimethylolpropane tri(meth)acrylate, pentaerythritol tri(meth)acrylate, trimethylolpropane EO-modified tri(meth)acrylate, glycerin PO-added tri(meth)acrylate, tris(meth)acryloyloxyethyl phosphate, pentaerythritol tetra(meth)acrylate, PO-modified trimethylolpropane tri(meth)acrylate, 2-(meth)acryloyloxyethyl phthalate, 3-(meth)acryloyloxy propyl acrylate, ω-carboxy (meth)acryloyloxyethyl phthalate, ditrimethylolpropane tetra (meth)acrylate, dipentaerythritol penta/hexa (meth)acrylate, dipentaerythritol hexa(meth)acrylate, and the like, and preferably include one type or two or more types selected from a group formed of phenoxyethyl acrylate, benzyl acrylate, 2-(2-vinyloxyethoxy) ethyl acrylate, dipropylene glycol diacrylate, tripropylene glycol diacrylate, 2-hydroxy 3-phenoxypropyl acrylate, and 4-hydroxybutyl acrylate.

Including the monomer which does not have an alicyclic structure in addition to the monomer which has an alicyclic structure makes the reactivity of the ultraviolet-curable composition after discharging with an ink jet method particularly excellent, while making the storage stability and discharge stability of the ultraviolet-curable composition excellent, and it is possible to make the productivity of the recorded matter particularly excellent and also to make the abrasion resistance or the like of the formed pattern particularly excellent.

Among these, in a case of including phenoxyethyl acrylate, it is possible to favorably array the metal powder in the vicinity of the outer surface of the printed portion in the recorded matter produced using the ultraviolet-curable composition and to make the glossiness of the obtained recorded matter superior.

In addition, in a case of including acrylic acid 2-(2-vinyloxyethoxy) ethyl, it is possible to make the curing speed of the ultraviolet-curable composition when irradiated with ultraviolet rays and the productivity of the recorded matter superior.

In addition, in a case of including phenoxyethyl acrylate and/or 2-hydroxy 3-phenoxypropyl acrylate, it is possible to make the flexibility of the printed portion which is formed by curing the ultraviolet-curable composition superior.

In addition, from the point of view of further improving the abrasion resistance of the printed portion which is formed by curing the ultraviolet-curable composition, one type or two or more types selected from a group formed of acrylic acid 2-(2-vinyloxyethoxy) ethyl, dipropylene glycol diacrylate, and tripropylene glycol diacrylate are preferably included, and acrylic acid 2-(2-vinyloxyethoxy) ethyl is more preferably included.

In addition, in a case of including phenoxyethyl acrylate, it is possible to more effectively prevent a decrease in the glossiness or the like due to unwanted creases or the like being generated in the printed portion which is formed by curing the ultraviolet-curable composition by making the contraction rate when curing the ultraviolet-curable composition smaller.

The content ratio of monomers other than a monomer which has an alicyclic structure in the ultraviolet-curable composition is preferably 4 mass % to 50 mass %, and more preferably 9 mass % to 40 mass %.

Due to this, the adjustment of the curing speed, flexibility, the contraction rate when curing, or the like of the ultraviolet-curable composition is easier. Here, the ultraviolet-curable composition may include two or more types of compounds as the monomer which does not have an alicyclic structure. In this case, the total content ratio is preferably a value within these ranges.

The ultraviolet-curable composition may include an oligomer (which includes a dimer, trimer, and the like), a prepolymer, and the like other than a monomer as a polymerizable compound. It is possible to use an oligomer and a prepolymer, for example, which have the monomer as described above as a constituent component. The ultraviolet-curable composition particularly preferably includes a multifunctional oligomer.

Due to this, it is possible to make the abrasion resistance or the like of a formed pattern particularly excellent while making the storage stability of the ultraviolet-curable composition and the discharge stability with an ink jet method particularly excellent. As an oligomer, a urethane oligomer of which the repeating structure is urethane, an epoxy oligomer of which the repeating structure is epoxy, and the like are preferably used.

The content ratio of the polymerizable compound in the ultraviolet-curable composition is preferably 68 mass % to 99 mass %, and more preferably 79 mass % to 98 mass %.

Due to this, it is possible to make the storage stability, discharge stability, and curability of the ultraviolet-curable composition superior, and also to make the glossiness, abrasion resistance, and the like of the recorded matter produced using the ultraviolet-curable composition superior. Here, the ultraviolet-curable composition may include two or more types of compounds as a polymerizable compound. In this case, the total content ratio of the compounds is preferably a value within these ranges.

Thixotropy Suppressing Agent

The ultraviolet-curable composition of the invention includes a thixotropy suppressing agent in addition to the metal powder and the polymerizable compound.

The thixotropy suppressing agent has a function which suppresses the thixotropy of the ultraviolet-curable composition and suppresses increases in the viscosity when adding shearing stress.

As the thixotropy suppressing agent, it is possible to use, for example, a phosphoric acid-based dispersing agent (a phosphoric ester-based dispersing agent), an alkyl amine-based dispersing agent, a urethane-based dispersing agent, an acryl-based dispersing agent, an acrylic silicon-based dispersing agent, fluorine-containing powder, a polycarboxylic acid-based dispersing agent, and the like, and one type or two or more types selected from a group formed of a phosphoric acid-based dispersing agent, an alkyl amine-based dispersing agent, and fluorine-containing powder are preferably used.

Due to this, the effects due to including the thixotropy suppressing agent are more remarkably exhibited and it is possible to make the discharge stability of the ultraviolet-curable composition with an ink jet method particularly preferable. In addition, since the thixotropy suppressing agent sufficiently exhibits the effects as described above even when the content ratio is comparatively low, it is possible to make the content ratio of other components in the ultraviolet-curable composition relatively high. As the result, it is possible to make the glossiness, abrasion resistance, and the like of the recorded matter particularly excellent while making the productivity of the recorded matter and the reliability of the recorded matter excellent.

In particular, by including a specific dispersing agent as a thixotropy suppressing agent, in addition to the effect of improving the discharge stability by including a thixotropy suppressing agent, it is possible to make the dispersion stability or the like of the metal powder or the like in the ultraviolet-curable composition excellent, and to make the storage stability of the ultraviolet-curable composition particularly excellent.

As the phosphoric acid-based dispersing agent (a phosphoric ester-based dispersing agent) which functions as a thixotropy suppressing agent, it is possible to use, for example, DISPERBYK-118, DISPERBYK-110, and DISPERBYK-102 (produced by BYK Japan K.K.), AQ-330 (produced by Kusumoto Chemicals, Ltd.), Prisurf A212C and Prisurf A215C (produced by DKS Co., Ltd.), and the like.

The acid value of the phosphoric acid-based dispersing agent (a phosphoric ester-based dispersing agent) which functions as a thixotropy suppressing agent is not particularly limited, and preferably 15 mgKOH/g to 110 mgKOH/g, and more preferably 20 mgKOH/g to 105 mgKOH/g.

As the amine-based dispersing agent (particularly a high branched polyamine-based dispersing agent) which functions as a thixotropy suppressing agent, it is possible to use, for example, DISPERBYK-140 (produced by BYK Japan K.K.) and the like.

The acid value of the alkyl amine-based dispersing agent which functions as a thixotropy suppressing agent is not particularly limited, and preferably 10 mgKOH/g to 100 mgKOH/g, and more preferably 20 mgKOH/g to 80 mgKOH/g.

The amine value of the amine-based dispersing agent which functions as a thixotropy suppressing agent is not particularly limited, and preferably 40 mgKOH/g to 100 mgKOH/g, and more preferably 50 mgKOH/g to 80 mgKOH/g.

As the urethane-based dispersing agent which functions as a thixotropy suppressing agent, it is possible to use, for example, DISPERBYK-161, 162, 163, 167, 168, 182, 183, 184, 185, 2163, and 2164 (the above are all produced by BYK Japan K.K.) and the like.

The amine value of the urethane-based dispersing agent which functions as a thixotropy suppressing agent is not particularly limited and preferably 5 mgKOH/g to 70 mgKOH/g, and more preferably 8 mgKOH/g to 50 mgKOH/g.

It is possible to use, for example, DISPERBYK-190, 191, 2013, 2009, 2000, 2012, and 2001 (the above are all produced by BYK Japan K.K.), UVX-36 and 39 (the above are all produced by Kusumoto Chemicals, Ltd.), or the like as the acryl-based dispersing agent which functions as a thixotropy suppressing agent.

The acid value of the acryl-based dispersing agent which functions as a thixotropy suppressing agent is not particularly limited and is preferably 0 mgKOH/g to 33 mgKOH/g, and more preferably 2 mgKOH/g to 30 mgKOH/g.

The amine value of the acryl-based dispersing agent which functions as a thixotropy suppressing agent is not particularly limited; however, 0 mgKOH/g to 50 mgKOH/g is preferable, and 3 mgKOH/g to 30 mgKOH/g is more preferable.

As the acrylic silicon-based dispersing agent which functions as a thixotropy suppressing agent, it is possible to use, for example, UVX-270 and 272 (the above are all produced by Kusumoto Chemicals, Ltd.), or the like.

Regarding the fluorine-containing powder as a thixotropy suppressing agent, the region which includes at least a surface of the constituent particles thereof is formed of a material which includes fluorine, and refers to a component other than the metal powder.

By including the fluorine-containing powder as a thixotropy suppressing agent, in addition to the effects of improvement of the discharge stability by including a thixotropy suppressing agent, it is possible to make the abrasion resistance or the like of the produced recorded matter particularly excellent. In particular, when the constituent particles of the metal powder and the constituent particles of the fluorine-containing powder are both formed of a fluorine-based material, it is possible to favorably arrange the constituent particles of the fluorine-containing powder in the vicinity of the constituent particles of the metal powder in the printed portion and to obtain a reliably excellent abrasion resistance at a higher level in the printed portion.

The fluorine-containing powder preferably has transparency in a cured product state where the polymerizable compound which forms the ultraviolet-curable composition is cured. Due to this, it is possible to make the aesthetic appearance of the recorded matter produced using the ultraviolet-curable composition of the invention particularly excellent.

Here, in a cured product with a thickness of 100 μm which is formed by curing an ultraviolet-curable composition which has the same composition as the above apart from not including the metal powder, the transmittance (the transmittance of light with a wavelength of 600 nm) of visible light in the thickness direction is preferably 85% or more and more preferably 90% or more.

Due to this, since the fluorine-containing powder easily transmits light for curing a polymerizable compound, the curing of the ultraviolet-curable composition easily uniformly advances to the inner side when forming the recorded matter and it is possible to make the aesthetic appearance of the recorded matter produced using the ultraviolet-curable composition of the invention superior.

Regarding the constituent particles of the fluorine-containing powder, it is sufficient if the region which includes at least a surface is formed of a material which includes fluorine and it is possible to use, for example, particles which are formed of fluorine-based polymers, inorganic fine particles which are subjected to a treatment by a fluorine-based surface treatment agent, or the like.

In particular, the fluorine-containing powder preferably includes particles which are formed of fluorine-based polymers.

Due to this, it is possible to easily obtain fluorine-containing powder as a powder of which the particle diameter is small as will be described below. In addition, it is possible to make the transparency particularly excellent in a cured product state where a polymerizable compound which forms the ultraviolet-curable composition is cured. In addition, since the surface energy of the constituent particles is particularly small and hydrophobic interaction with the polymerizable compound which is included in the ultraviolet-curable composition is particularly large, the constituent particles are easily stabilized by moving the gas-liquid interface, the fluorine-containing powder is easily fixed on the surface of the recorded matter which is obtained by ultraviolet ray curing as a result, and it is possible to make the abrasion resistance of the recorded matter particularly excellent.

In particular, in a case where the fluorine-containing powder includes particles which are formed of fluorine-based polymers as constituent particles, since the specific gravity is approximately 1.7 to 2.2, which is lighter than metals such as aluminum, the flow in the ultraviolet-curable composition occurs to the same extent as the metal powder, thus the abrasion resistance of the recorded matter is effectively improved with a smaller added amount.

In a case where the fluorine-containing powder includes particles which are formed of fluorine-based polymers as the constituent particles, examples of the fluorine-based polymers include polytetrafluoroethylene, tetrafluoroethylene-hexafluoropropylene copolymers, tetrafluoroethylene-ethylene copolymers, tetrafluoroethylene-perfluoroalkyl vinyl ether copolymers, polychlorotrifluoroethylene, polyvinylidene fluoride, and the like, and polytetrafluoroethylene is preferable among these. Due to this, the surface energy of the fluorine-containing powder is particularly small and it is possible to effectively improve the abrasion resistance of the recorded matter with a smaller added amount.

In addition, the constituent particles of the fluorine-containing powder may be formed of dendritic polymers.

Due to this, it is possible to favorably obtain the fluorine-containing powder as a powder of which the constituent particles are spheres and the particle diameter is small as will be described below. In addition, it is possible to make the particle distribution of the fluorine-containing powder sharper.

In the invention, the dendritic polymer includes a dendrimer or hyperbranched polymer in a skeleton structure and is generally provided with a core and dendrons in the case of dendrimer. On the other hand, the hyperbranched polymer has a single skeleton structure without the distinction of a core or dendrons.

In a case where the constituent particles of the fluorine-containing powder are formed of dendritic polymers (particularly dendrimers), as the dendrimer (dendrimer which contains a fluorine atom), it is possible to use, for example, dendritic polymers which are formed of polymers which have an acryl skeleton, polymers which have an epoxy skeleton, polymers which have a polyamide amine (PA-MAM) skeleton, polymers which have a bis(hydroxymethyl) propanoic acid (MPA) skeleton, polymers which have a polypropylene imine skeleton, polymers which have a polylysine skeleton, polymers which have a polyphenyl ether skeleton, polymers which have a dithiocarbamate skeleton, and the like, and a dendritic polymer formed of polymers which have an acryl skeleton or a dithiocarbamate skeleton is particularly preferable.

Due to this, it is possible to make the transparency of the constituent particles of the fluorine-containing powder in the printed portion particularly excellent and to make the aesthetics (aesthetic appearance) of the recorded matter particularly excellent. In addition, since the dendritic polymer (dendrimer which contains a fluorine atom) which has an acryl skeleton is excellent in compatibility with the polymerizable compound which will be described below in detail, it is possible to make the storage stability or the like of the ultraviolet-curable composition particularly excellent, it is possible to make the adhesiveness between a polymer of a polymerizable compound and dendrimer which contains a fluorine atom in the printed portion which is formed using the ultraviolet-curable composition particularly excellent, and it is possible to make the abrasion resistance, film strength, or the like of the printed portion particularly excellent.

Examples of the core of the dendrimer which contains a fluorine atom include pentaerythritol hexaacrylate, trimethylolpropane triacrylate, pentaerythritol tetraacrylate, and the like which are bifunctional or higher multifunctional acrylates.

Examples of the dendrons of the dendrimer (dendrimer which contains a fluorine atom) which is included in the ultraviolet-curable composition of the invention include trifunctional or higher multifunctional acrylates and the like.

It is possible to use, for example, a dendrimer which is disclosed in JP-A-2002-220468, JP-A-2003-226611, JP-A-2009-235372, and the like as the dendrimer which contains a fluorine atom and a fluorine atom-containing low molecule (a dendron constituent unit) which forms the dendrimer.

In addition, as a dendritic polymer in a case where the dendritic polymer (a dendritic polymer which contains a fluorine atom) which is included in the ultraviolet-curable composition is a hyperbranched polymer, it is possible to use, for example, the dendritic polymer which has a dithiocarbamate skeleton and which is disclosed in Japanese Patent Application No. 2012-546933 (P2012-546933).

The surface free energy of the dendritic polymer which contains a fluorine atom is preferably 18 mN/m to 28 mN/m, and more preferably 19 mN/m to 25 mN/m.

Due to this, it is possible to make the abrasion resistance of the printed portion particularly excellent while making the discharge stability of the ultraviolet-curable composition with an ink jet method particularly excellent.

In a case where the fluorine-containing powder includes inorganic fine particles subjected to a treatment by a fluorine-based surface treatment agent as constituent particles, examples of constituent material of the inorganic fine particles (base particles) include silica, alumina, titania, magnesium oxide, calcium oxide, mica, carbon black, glass, talc, aluminum hydroxide, magnesium hydroxide, asbestos, iron oxide, zinc oxide, calcium carbonate, barium sulfide, calcium sulfate, graphite, boron, and the like.

In particular, the inorganic fine particles (base particles) are preferably formed of a material of which at least the surface has an oxide. Due to this, since it is possible for the fluorine-based surface treatment agent to react finely, the energy of the surface on which the fluorine-containing powder is the constituent particles is extremely small, a large number of fine particles are present on the surface of the recorded matter with a small added amount, and it is possible for the fixed particles to form a convex shape at a sufficient height, thus it is possible to make the abrasion resistance particularly excellent.

In addition, the inorganic fine particles (base particles) are preferably formed of one type or two or more types selected from among the material described above, particularly, a group formed of silica, alumina, and titania. Due to this, since it is possible to increase the hardness of the constituent particles of the fluorine-containing powder, a treatment with the fluorine-based surface treatment agent is easily performed, and the surface treatment with higher precision is possible, thus, even in a case where the content ratio of the fluorine-containing powder in the ultraviolet-curable composition is made to be lower, it is possible to make the abrasion resistance and durability of the recorded matter produced using the ultraviolet-curable composition sufficiently excellent. In addition, since it is possible to make the transparency of the fluorine-containing powder particularly high, it is possible to more reliably make the aesthetic appearance of the recorded matter produced using the ultraviolet-curable composition excellent.

In particular, in a case where the base particles (the inorganic fine particles) are formed of silica, the following effects are obtained. That is, silica is a material with high reactivity with a fluorine-based silane compound as the fluorine-based surface treatment agent and is a material with particularly high transparency and high hardness (Mohs hardness 7). For this reason, it is possible to make the abrasion resistance and durability of the recorded matter produced using the ultraviolet-curable composition superior. In addition, it is possible to more reliably make the aesthetic appearance of the recorded matter which is produced using the ultraviolet-curable composition excellent. In addition, since silica is a material at a low cost with high versatility, it is also preferable from the point of view of reduction in the production cost of the ultraviolet-curable composition and the recorded matter and stable supply of the ultraviolet-curable composition and the recorded matter.

In addition, in a case where the base particles are formed of alumina, the following effects are obtained. That is, alumina is a material with high reactivity with a fluorine-based silane compound as the fluorine-based surface treatment agent and a material with particularly high transparency and high hardness (Mohs hardness 9). For this reason, it is possible to make the abrasion resistance and durability of the recorded matter produced using the ultraviolet-curable composition superior. In addition, it is possible to more reliably make the aesthetic appearance of the recorded matter which is produced using the ultraviolet-curable composition excellent. In addition, since alumina is a material with high versatility at a low cost, it is also preferable from the point of view of reducing the production cost of the ultraviolet-curable composition and the recorded matter and stable supply of the ultraviolet-curable composition and the recorded matter.

In addition, in a case where the base particles are formed of titania, the following effects are obtained. That is, titania is a material with particularly high transparency and high hardness (Mohs hardness 7 to 7.5). For this reason, it is possible to make the abrasion resistance and durability of the recorded matter produced using the ultraviolet-curable composition superior. In addition, it is possible to more reliably make the aesthetic appearance of the recorded matter which is produced using the ultraviolet-curable composition excellent. In addition, since titania is a material with high versatility at a low cost, it is also preferable from the point of view of reducing the production cost of the ultraviolet-curable composition and the recorded matter and stable supply of the ultraviolet-curable composition and the recorded matter. In addition, titania has extremely high stability and high resistance to reactive gases such as hydrogen fluoride, hydrogen sulfide, $SO_3$, and chlorine.

In a case where the fluorine-containing powder includes inorganic fine particles subjected to a treatment by a fluorine-based surface treatment agent as constituent particles, it is possible to use an agent which includes at least one fluorine atom in the molecule as the fluorine-based surface treatment agent and it is possible to use, for example, the fluorine-based compound (the fluorine-based surface treatment agent) which is described as a surface treatment agent with respect to the metal powder (base particles) described above. In more detail, examples thereof include compounds (a fluorine-based short chain compound, a fluorine-based long chain compound, a fluorine-based silane compound, a fluorine-based phosphate compound, a fluorine-substituted fatty acid, a fluorine-based isocyanate compound, and the like) which have a structure in which at least some of the hydrogen atoms of the short chain compound, the long chain compound, the silane compound, the phosphate compound, the carboxylic acid, and the isocyanate compound described above are substituted by fluorine atoms or the like.

In particular, in a case of using the fluorine-based silane compound, since the reactivity with silica and alumina is high, it is possible to more stably disperse the constituent particles of the fluorine-containing powder formed of inorganic fine particles which are formed of the inorganic material subjected to a treatment by a fluorine-based silane compound as the fluorine-based surface treatment agent in the ultraviolet-curable composition.

In addition, in a case of using the fluorine-based phosphate compound, it is possible to more effectively perform the surface treatment with the inorganic fine particles which are formed of iron oxide, aluminum, alumina, and the like. In addition, since the surface treatment agent of the phosphate compound is strong against acid, the obtained recorded matter exhibits excellent durability and weather resistance even under an acidic environment.

In addition, in a case of using a fluorine-substituted fatty acid (a fluorine-based fatty acid), since the reactivity with calcium carbonate and titania is high, it is possible to more stably disperse the constituent particles of the fluorine-containing powder formed of inorganic fine particles which are formed of the inorganic material subjected to a treatment by a fluorine-substituted fatty acid as the fluorine-based surface treatment agent in the ultraviolet-curable composition.

In addition, in a case of using a fluorine-based isocyanate compound, it is possible to make the bonding force of the base particles (inorganic fine particles) and the surface treatment agent particularly strong.

In a case where the fluorine-containing powder includes inorganic fine particles subjected to a treatment by a fluorine-based surface treatment agent as constituent particles, the fluorine-based surface treatment agent which is used for the surface treatment of inorganic fine particles and the fluorine-based surface treatment agent which is used for the surface treatment of the constituent particles of the metal powder may be the same type of surface treatment agent. Due to this, by the surface characteristics (interface energy, a charged state, and the like) of both the metal powder and the fluorine-containing powder being similar, the stability of dispersion in the ultraviolet-curable composition is particularly excellent and it is possible to more effectively suppress increases in the viscosity or particle size over a longer period.

The average particle diameter ($D_{50}$) of the fluorine-containing powder is preferably 1 nm to 50 nm, more preferably 2 nm to 10 nm, and even more preferably 2.5 nm to 9 nm.

Due to this, it is possible to make the discharge stability of the ultraviolet-curable composition particularly excellent. In addition, it is possible to make the storage stability of the ultraviolet-curable composition particularly excellent and to make the glossiness and abrasion resistance of the printed portion which is formed using the ultraviolet-curable composition particularly excellent.

When the thickness of the metal powder is $T_M$ [µm] and the average particle diameter of the fluorine-containing powder is $D_F$ [µm], a relationship of $0.05 \leq D_F/T_M \leq 0.7$ is preferably satisfied, a relationship of $0.07 \leq D_F/T_M \leq 0.5$ is more preferably satisfied, and a relationship of $0.10 \leq D_F/T_M \leq 0.35$ is even more preferably satisfied.

Due to this, it is possible to more effectively prevent the constituent particles of the fluorine-containing powder from being excessively present on the outer surface side (the viewing side of an observer) compared to the constituent particles of the metal powder in the recorded matter, it is possible to make the glossiness of the printed portion superior, and it is possible to make the abrasion resistance of the recorded matter particularly excellent.

When the average particle diameter of the metal powder is $D_M$ [µm] and the average particle diameter of the fluorine-containing powder is $D_F$ [µm], a relationship of $5 \leq D_M/D_F \leq 300$ is preferably satisfied, a relationship of $15 \leq D_M/D_F \leq 200$ is more preferably satisfied, and a relationship of $25 \leq D_M/D_F \leq 200$ is even more preferably satisfied.

Due to this, it is possible to make the glossiness of the printed portion superior and it is possible to make the abrasion resistance of the recorded matter particularly excellent.

The particles which form the fluorine-containing powder may take any shape such as a sphere, a spindle, a needle (a bar shape), or flakes, but preferably form spheres.

Due to this, it is possible to make the abrasion resistance of the recorded matter produced using the ultraviolet-curable composition particularly excellent. In addition, in a case where the particles which form the fluorine-containing powder form spheres, it is possible to more effectively prevent the fluorine-containing powder from having an adverse influence on the appearance of the recorded matter, while making the content ratio of the fluorine-containing powder in the ultraviolet-curable composition (in the printed portion) high and more effectively exhibiting the effects of including the fluorine-containing powder described above.

In addition, in a case where the particles which form the fluorine-containing powder are spindle-shaped or bar-shaped, since the specific surface area of the particles which forms the fluorine-containing powder is large, the particles easily come to the surface in the ultraviolet-curable composition which is added onto the recording medium, it is possible to more favorably arrange the particles in the vicinity of the outer surface of the printed portion, and it is possible to make the abrasion resistance excellent even with a comparatively small content ratio.

In addition, in a case where the particles which form the fluorine-containing powder are spindle-shaped, since the area is increased by balancing and orienting a long axis direction of the spindle shape with the surface so as to come into contact therewith or the particles are hardened and fixed in a state of being deep in the recorded matter, an effect of further reinforcing the abrasion resistance of the recorded matter is also obtained.

The content ratio of the thixotropy suppressing agent in the ultraviolet-curable composition is preferably 0.2 mass % to 2.0 mass %, more preferably 0.3 mass % to 1.5 mass %, and even more preferably 0.5 mass % to 1.0 mass %.

Due to this, it is possible to make the discharge stability of an ultraviolet-curable composition with an ink jet method particularly excellent and make the productivity of the recorded matter and the reliability of the recorded matter particularly excellent, and it is also possible to make the glossiness, the abrasion resistance, and the like of the recorded matter particularly excellent.

Substance A

In addition, the ultraviolet-curable composition of the invention preferably includes a substance A which has a partial structure which is shown by Formula (8).

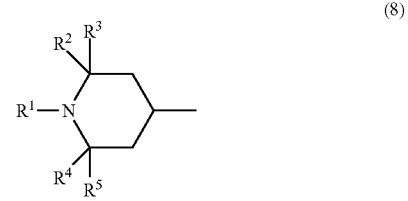

(8)

(In Formula (8), $R^1$ indicates an oxygen atom, a hydrogen atom, a hydrocarbon group, or an alkoxyl group and $R^2$, $R^3$, $R^4$, and $R^5$ each independently indicate a hydrogen atom or a hydrocarbon group.)

By the ultraviolet-curable composition including the substance A which has the chemical structure along with the thixotropy suppressing agent described above and moreover including a monomer which has an alicyclic structure, it is possible to make the storage stability, curability, and discharge stability of the ultraviolet-curable composition with an ink jet method particularly excellent. In addition, in the recorded matter produced using the ultraviolet-curable composition, it is possible to more effectively exhibit the natural glossiness and sense of luxury of the metal material which forms the metal powder, make the glossiness and abrasion resistance of the printed portion particularly excellent, and make the durability of the recorded matter particularly excellent.

In Formula (8), it is sufficient if $R^1$ is an oxygen atom, a hydrogen atom, a hydrocarbon group, or an alkoxyl group (a group in which a chain or alicyclic hydrocarbon group is bonded with an oxygen atom); however, a hydrogen atom, a methyl group, or an octyloxy group is particularly preferable.

Due to this, it is possible to make the storage stability and discharge stability of the ultraviolet-curable composition superior and it is possible to make the glossiness and abrasion resistance of the printed portion which is formed using the ultraviolet-curable composition superior.

In addition, in Formula (8), it is sufficient if $R^2$ to $R^5$ are each independently a hydrogen atom or a hydrocarbon group; however, an alkyl group with 1 to 3 carbon atoms is preferable, and a methyl group is more preferable.

Due to this, it is possible to make the storage stability and discharge stability of the ultraviolet-curable composition superior and it is possible to make the glossiness and abrasion resistance of the printed portion which is formed using the ultraviolet-curable composition superior.

The content ratio of the substance A in the ultraviolet-curable composition is preferably 0.1 mass % to 5.0 mass % and more preferably 0.5 mass % to 3.0 mass %.

Due to this, it is possible to make the storage stability, discharge stability, and curability of the ultraviolet-curable composition superior and it is also possible to make the glossiness, abrasion resistance, and the like of the recorded matter produced using the ultraviolet-curable composition superior. Here, the ultraviolet-curable composition may include two or more types of compounds as the substance A.

In this case, the total of the content ratio of the compounds is preferably a value within these ranges.

When the content ratio of the substance A is $X_A$ [mass %] and the content ratio of the metal powder is $X_M$ [mass %], a relationship of $0.01 \leq X_A/X_M \leq 0.8$ is preferably satisfied and a relationship of $0.05 \leq X_A/X_M \leq 0.4$ is more preferably satisfied.

By satisfying the relationship, it is possible to make the storage stability and discharge stability of the ultraviolet-curable composition superior and it is possible to make the glossiness and abrasion resistance of the printed portion which is formed using the ultraviolet-curable composition superior.

Defoaming Agent

The ultraviolet-curable composition may include a defoaming agent as an additive.

Since it is possible for the defoaming agent to reduce the surface tension of the ultraviolet-curable composition and greatly reduce air bubbles which are generated at the meniscus position in the vicinity of the nozzles, it is possible to make the discharge stability in the ink jet of the ultraviolet-curable composition excellent.

In contrast, in a case where the ultraviolet-curable composition does not contain a defoaming agent, by the pigment or fluorine-containing particles subjected to a treatment by a fluorine-based surface treatment agent with low surface free energy being easily arrayed on a gas-liquid interface in the air bubbles which are generated in the ultraviolet-curable composition, it is possible for the air bubbles to be stably present for a long time. As the result, discharge energy which is generated from piezoelectric elements or the like in an ink jet method being absorbed or attenuated in the stabilized air bubbles causes various problems such as discharge failures, decreases in the liquid droplet weight, decrease in the flying speed of liquid droplets, or bending in the flying direction. For this reason, it is not possible to sufficiently make the discharge stability excellent and the uniformity of the ultraviolet-curable composition also remarkably deteriorates.

In particular, it is possible to make the discharge stability excellent by using an acryl-based defoaming agent which includes fluorine or an acryl-based defoaming agent which does not have a polar functional group as a defoaming agent. Since the molecular weight of the defoaming agents is small and the dispersing and moving speed is extremely fast compared to the pigment or fluorine-containing particles subjected to a treatment by a fluorine-based surface treatment agent, it is possible to effectively suppress the generation of air bubbles.

Specific examples of the acryl-based defoaming agent which includes fluorine which is able to be used in the invention include BYK-3440 (produced by BYK Japan K.K.), BYK-3441 (produced by BYK Japan K.K.), and the like.

In addition, the acryl-based defoaming agent which does not have a polar functional group which is able to be used in the invention is an acryl copolymer which does not have a functional group such as a hydroxyl group, an amino group, a carboxyl group, a cyano group, and a ketone group of which the electronegativity is high in a molecule as a polar functional group, and specific examples thereof include DISPERBYK-354 (produced by BYK Japan K.K.), DISPERBYK-392 (produced by BYK Japan K.K.), and the like.

The content of the defoaming agent is preferably 1.5 weight % or less and more preferably 0.1 weight % to 1.0 weight %.

Due to this, it is possible to make the storage stability, discharge stability, and curability of the ultraviolet-curable composition superior, while making the glossiness of the recorded matter produced using the ultraviolet-curable composition sufficiently excellent. Here, the defoaming agent may include two or more types of compounds as the acryl-based defoaming agent which includes fluorine or the acryl-based defoaming agent which does not have a polar functional group.

In this case, the total of the content ratio of the compounds is preferably a value within these ranges. Here, when the content ratio of the defoaming agent in the ultraviolet-curable composition is extremely high, it is difficult to favorably arrange the metal powder and fluorine-containing powder in the vicinity of the outer surface of the ultraviolet-curable composition due to the concentration of the excess defoaming agent which does not affect defoaming being increased and there is a possibility that it will be difficult to make the glossiness and abrasion resistance of the recorded matter (printed portion) which is finally obtained sufficiently excellent.

Other Components

The ultraviolet-curable composition of the invention may include components (other components) other than the components described above. Examples of the components include photopolymerization initiators, slipping agents (a levelling agent), solvents, polymerization promoters, polymerization inhibitors, dispersing agents which do not function as a thixotropy suppressing agent, permeation promoters, moistening agents (a moisturizer), coloring agents, fixing agents, antifungal agents, preservative agents, antioxidants, chelating agents, viscosity thickening agents, radiosensitizing agents (radiosensitizing pigments), and the like.

The photopolymerization initiator is not particularly limited as long as the photopolymerization initiator generates an active species such as radicals or cations by being irradiated with ultraviolet rays and initiates the polymerization reaction of the polymerizable compound described above. As the photopolymerization initiator, it is possible to use a photo-radical polymerization initiator or a photo-cation polymerization initiator; however, a photo-radical polymerization initiator is preferably used. In a case of using a photopolymerization initiator, the photopolymerization initiator preferably has an absorption peak in an ultraviolet ray region.

Examples of the photo-radical polymerization initiator include aromatic ketones, acyl phosphine oxide compounds, aromatic onium salt compounds, organic peroxide, thio compound (thioxanthone compounds, thiophenyl group-containing compounds, and the like), hexaarylbiimidazole compounds, ketoxime ester compounds, borate compounds, azinium compounds, metallocene compounds, active ester compounds, compounds which have a carbon halogen bond, alkylamine compounds, and the like.

Among these, from the point of view of the solubility in a polymerizable compound and curability, at least one type selected from an acyl phosphine oxide compound and a thioxanthone compound is preferable, and the use of an acyl phosphine oxide compound and a thioxanthone compound together is more preferable.

Specific examples of the photo-radical polymerization initiator include acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methyl-acetophenone, 4-chloro benzophenone, 4,4'-dimethoxy benzophenone, 4,4'-diaminobenzophenone, Michler's ketone, benzoin propyl ether, benzoin ethyl ether, benzyl dimethyl ketal, 1-(4-isopropyl phenyl)-2-hydroxy-2-methyl propan-1-one, 2-hydroxy-2-methyl-1-phenyl propan-1-one, thioxanthone, diethylthioxanthone, 2-isopropylthioxanthone, 2-chlorothioxanthone, 2-methyl-1-[4-(methylthio) phenyl]-2-morpholino-propan-1-one, bis(2,4,6-trimethyl benzoyl)-phenyl phosphine oxide, 2,4,6-trimethyl benzoyl-diphenyl-phosphine oxide, 2,4-diethylthioxanthone, bis-(2, 6-dimethoxybenzoyl)-2,4,4-trimethyl pentyl phosphine oxide and the like, and one type or two or more types selected from among these can be used in combination.

The content of the photopolymerization initiator in the ultraviolet-curable composition is preferably 0.5 mass % to 10 mass %.

When the content of the photopolymerization initiator is in this range, the ultraviolet ray curing speed is sufficiently high and there is little undissolved remaining photopolymerization initiator or coloring which is derived from the photopolymerization initiator.

When the ultraviolet-curable composition includes a slipping agent, the surface of the recorded matter is smooth due to the levelling effect and the abrasion resistance is improved.

It is possible to use a slipping agent without being particularly limited, and examples thereof include silicone-based surfactants such as polyester-modified silicone, polyether-modified silicone, and polyacrylate-modified silicone, and polymer-based surfactants such as polyacrylate, and polyester, and polyether-modified polydimethylsiloxane, polyester-modified polydimethylsiloxane, or polyacrylate-modified dimethylsiloxane are preferably used.

Here, the ultraviolet-curable composition of the invention may include a polymerization inhibitor; however, even in a case of including a polymerization inhibitor, the content ratio of the polymerization inhibitor in the ultraviolet-curable composition is preferably 0.6 mass % or less and more preferably 0.3 mass % or less.

Due to this, since it is possible to make the content ratio of the polymerizable compound in the ultraviolet-curable composition relatively high, it is possible to make the abrasion resistance or the like of the printed portion which is formed using the ultraviolet-curable composition particularly excellent.

In addition, the ultraviolet-curable composition of the invention preferably does not include an organic solvent which is removed (evaporated) in a step of producing the recorded matter. Due to this, it is possible to effectively prevent the occurrence of the problem of volatile organic compounds (VOC).

Recorded Matter

Next, description will be given of the recorded matter of the invention.

The recorded matter of the invention is produced by adding the ultraviolet-curable composition described above onto a recording medium with an ink jet method and then irradiating the ultraviolet-curable composition with the ultraviolet rays. That is, the recorded matter of the invention is provided with a cured product of the ultraviolet-curable composition described above and a recording medium.

The recorded matter has a pattern (a printed portion) with excellent glossiness and in which the generation of defects is prevented.

As described above, the ultraviolet-curable composition according to the invention includes a polymerizable compound and is excellent in adhesion with respect to a recording medium. In this manner, since the ultraviolet-curable composition of the invention is excellent in adhesion to a recording medium, the recording medium may be any medium and either absorbent or non-absorbent media may be used, and it is possible to use, for example, paper (plain paper, ink jet specialty paper, and the like), plastic material, metal, ceramics, wooden material, shells, cotton, polyester, natural fiber and synthetic fiber such as wool, non-woven fabric, and the like. In addition, the shape of the recording medium is not particularly limited and may be any shape, such as a sheet.

As the liquid droplet discharging method (the ink jet method), it is possible to use a piezo method, a method of discharging ink by foam (bubbles) which are generated by heating the ink, or the like; however, from the point of view of difficulty in degeneration of the ultraviolet-curable composition or the like, a piezo method is preferable.

It is possible to discharge the ultraviolet-curable composition with an ink jet method using a liquid droplet discharging apparatus which is known in the art.

The frequency relating to the discharge of the ultraviolet-curable composition with an ink jet method is preferably 8 kHz or more and more preferably 12 kHz to 60 kHz.

Due to this, it is possible to make the productivity of the recorded matter particularly excellent. In addition, while the problem of discharge failure of the ultraviolet-curable composition occurs particularly easily in the background art, when performing the discharge with an ink jet method in the high frequency region, it is possible to effectively prevent the occurrence of the problem described above in the invention even in a case of discharging in the high frequency region. That is, when the frequency relating to the discharge of the ultraviolet-curable composition with an ink jet method is a value in the range described above, the effects according to the invention are more remarkably exhibited.

The ultraviolet-curable composition which is discharged with an ink jet method is cured by being irradiated with ultraviolet rays.

As an ultraviolet ray source, it is possible to use, for example, a mercury lamp, a metal halide lamp, an ultraviolet light emitting diode (UV-LED), an ultraviolet laser diode (UV-LD), and the like. Among these, an ultraviolet light emitting diode (UV-LED) and an ultraviolet laser diode (UV-LD) are preferable from the point of view of miniaturization, long life, high efficiency, and low costs.

The recorded matter of the invention may be for any use and, for example, may be applied to a decorative material or other use. Specific examples of the recorded matter of the invention include vehicular interior components such as a console lid, a switch base, a center cluster, an interior panel, an emblem, a center console, and a meter name plate, operation portions (key switches) of various types of electronic equipment, a decorative portion which exhibits a decorative property, an index, objects for display such as logos, and the like.

Description was given above of aspects of the invention based on favorable embodiments; however, the invention is not limited thereto.

For example, in the embodiment described above, description was mainly given of the case where the recorded matter of the invention is formed by a recording medium (a substrate) and a printed portion; however, the recorded matter of the invention may have other configurations in addition to the recording medium (substrate) and the printed portion.

EXAMPLE

Next, description will be given of specific examples of the invention.
1. Producing Ultraviolet-Curable Composition (Ultraviolet-curable Ink Jet Composition)

Example 1

Firstly, a film (with a surface roughness Ra of 0.02 μm or less) made of polyethylene terephthalate with a smooth surface is prepared.

Next, silicone oil is coated on the entirety of one surface of the film.

Next, a film which is formed of Al is formed on the surface side on which silicone oil is coated by a vapor deposition method.

Next, a film (a substrate) made of polyethylene terephthalate on which a film of Al was formed was inserted in a liquid which was formed by dissolving $CF_3(CF_2)_5(CH_2)_2O$—$PO(OH)_2$: 1 part by mass as a fluorine-based surface treatment agent in diethylene glycol diethyl ether: 99 parts by mass, and ultrasonic vibration of 27 kHz was applied thereto at 55° C. for 3 hours. Due to this, a dispersing liquid of the metal powder formed of flaky particles where base particles made of Al were subjected to a surface treatment using $CF_3(CF_2)_5(CH_2)_2O$—$PO(OH)_2$ is obtained.

The volume average particle diameter of the metal powder which was obtained in this manner was 0.45 μm, the particle diameter ($D_{10}$) at the volume accumulation distribution ratio 10% from the fine particle side of the metal powder was 0.28 μm, the particle diameter ($D_{90}$) at the volume accumulation distribution ratio 90% from the fine particle side of the metal powder was 0.77 μm, and the half-value width in the particle distribution of the metal powder was 0.32 μm.

Next, the ultraviolet-curable composition is obtained by mixing the dispersing liquid of the metal powder with acryloylmorpholine as a monomer (a polymerizable compound) which has an alicyclic structure, phenoxyethyl acrylate as a monomer (a polymerizable compound) which does not have an alicyclic structure, tetrahydrofurfuryl acrylate as a monomer (a polymerizable compound) which has an alicyclic structure, Disperbyk-118 (a phosphoric acid-based dispersing agent) as a thixotropy suppressing agent, the substance A which has a chemical structure which is represented by Formula (9) described below, Irgacure 819 (produced by BASF Corp.) as a photopolyerization initiator, Speedcure TPO (produced by ACETO Corp.) as a photopolyerization initiator, Speedcure DETX (produced by Lambson Ltd.) as a photopolyerization initiator, and LF-1982 (produced by Kusumoto Chemicals, Ltd.).

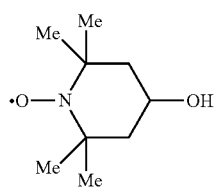

(9)

Examples 2 to 20

The ultraviolet-curable compositions were produced in the same manner as Example 1 apart from forming the constituent particles of the metal powder as shown in Table 1 and making the compositions as shown in Table 2 and Table 3 by changing the types and ratios of the raw materials used for preparation of the ultraviolet-curable composition.

Comparative Example 1

The ultraviolet-curable composition was produced in the same manner as Example 1 apart from not using a thixotropy suppressing agent and making the compositions as shown in Table 3 by changing the types and ratios of the raw material used for preparation of the ultraviolet-curable composition.

Comparative Example 2

The ultraviolet-curable composition was produced in the same manner as Example 1 apart from making the composition as shown in Table 3 by changing the types and ratios of the raw materials used for preparation of the ultraviolet-curable composition.

Regarding each of the Examples and Comparative Examples, the configurations of the metal powder which is included in the ultraviolet-curable composition are shown together in Table 1 and the compositions of the ultraviolet-curable composition are shown together in Table 2 and Table 3. Here, in the tables, $CF_3(CF_2)_5(CH_2)_2O$—$PO(OH)_2$ as a fluorine-based phosphate compound is shown as "FAP1", $(CF_3(CF_2)_7CH_2CH_2Si(OC_2H_5)_3)$ as a fluorine-based silane compound as "FAS1", $(CF_3(CF_2)_5CH_2CH_2Si(OC_2H_5)_3)$ as a fluorine-based silane compound as "FAS2", $CF_3(CF_2)_7(CH_2)_2COOH$ as a fluorine-substituted fatty acid as "FFA1", $CF_3(CF_2)_7(CH_2)_2NCO$ as a fluorine-based isocyanate compound as "IS1", lauryl phosphoric acid: $CH_3(CH_2)_{11}$—$(OCH_2CH_2)_2$—O—$PO(OH)_2$ as an alkylphosphate compound as "LAP", laures-2 phosphoric acid: $CH_3(CH_2)_{11}$—$(OCH_2CH_2)_2$—O—$PO(OH)_2$ as an alkyl ether phosphate compound as "LEP", octyl triethoxy silane as an alkyl silane compound as "OTS", $CH_3(CH_2)_{70}$—$PO(OH)_2$ as "AP1", γ-butyrolactone acrylate as a monomer (a polymerizable compound) which has an alicyclic structure as "BLA", tetrahydrofurfuryl acrylate as a monomer (a polymerizable compound) which has an alicyclic structure as "THFA", N-vinylcaprolactam as a monomer (a polymerizable compound) which has an alicyclic structure as "VC", N-vinylpyrrolidone as a monomer (a polymerizable compound) which has an alicyclic structure as "VP", acryloylmorpholine as a monomer (a polymerizable compound) which has an alicyclic structure as "AMO", tris(2-acryloyloxyethyl) isocyanurate as a monomer (a polymerizable compound) which has an alicyclic structure as "TAOEI", dicyclopentenyloxyethyl acrylate as a monomer (a polymerizable compound) which has an alicyclic structure as "DCPTeOEA", adamantyl acrylate as a monomer (a polymerizable compound) which has an alicyclic structure as "AA", dimethylol tricyclodecane diacrylate as a monomer (a polymerizable compound) which has an alicyclic structure as "DMTCDDA", dimethylol dicyclopentane diacrylate as a monomer (a polymerizable compound) which has an alicyclic structure as "DMDCPTA", dicyclopentenyl acrylate as a monomer (a polymerizable compound) which has an alicyclic structure as "DCPTeA", dicyclopentanyl acrylate as a monomer (a polymerizable compound) which has an alicyclic structure as "DCPTaA", isobornyl acrylate as a monomer (a polymerizable compound) which has an alicyclic structure as "IBA", cyclohexyl acrylate as a monomer (a polymerizable compound) which has an alicyclic structure as "CHA", diacrylated isocyanurate as a monomer (a polymerizable compound) which has an alicyclic structure as "DAI", triacrylated isocyanurate as a monomer (a polymerizable compound) which has an alicyclic structure as "TAI", γ-butyrolactone methacrylate as a monomer (a polymerizable compound) which has an alicyclic structure as "BLM", tetrahydrofurfuryl methacrylate as a monomer (a polymerizable compound) which has an alicyclic structure as "THFM", dicyclopentenyloxyethyl methacrylate as a monomer (a polymerizable compound) which has an alicyclic structure as "DCPTeOEM", adamantyl methacrylate as a monomer (a polymerizable compound) which has an alicyclic structure as "AM", pentamethylpiperidyl methacrylate as a monomer (a polymerizable compound) which has an alicyclic structure as "PMPM", tetramethylpiperidyl methacrylate as a monomer (a polymerizable compound) which has an alicyclic structure as "TMPM", 2-methyl-2-adamantyl methacrylate as a monomer (a polymerizable compound) which has an alicyclic structure as "MAM", 2-ethyl-2-adamantyl methacrylate as a monomer (a polymerizable compound) which has an alicyclic structure as "EAM", mevalonic lactone methacrylate as a monomer (a polymerizable compound) which has an alicyclic structure as "MLM", dicyclopentenyl methacrylate as a monomer (a polymerizable compound) which has an alicyclic structure as "DCPTeM", dicyclopentanyl methacrylate as a monomer (a polymerizable compound) which has an alicyclic structure as "DCPTaM", isobornyl methacrylate as a monomer (a polymerizable compound) which has an alicyclic structure as "IBM", cyclohexyl methacrylate as a monomer (a polymerizable compound) which has an alicyclic structure as "CHM", cyclohexanespiro-2-(1,3-dioxolane-4-il) methyl acrylate as a monomer (a polymerizable compound) which has an alicyclic structure as "CHDOLA", (2-methyl-2-ethyl-1,3-dioxolane-4-il) methyl acrylate as a monomer (a polymerizable compound) which has an alicyclic structure as "MEDOLA", phenoxyethyl acrylate as a monomer (a polymerizable compound) which does not have an alicyclic structure as "PEA", dipropylene glycol diacrylate as a monomer (a polymerizable compound) which does not have an alicyclic structure as "DPGDA", tripropylene glycol diacrylate as a monomer (a polymerizable compound) which does not have an alicyclic structure as "TPGDA", 2-hydroxy-3-phenoxypropyl acrylate as a monomer (a polymerizable compound) which does not have an alicyclic structure as "HPPA", 4-hydroxybutyl acrylate as a monomer (a polymerizable compound) which does not have an alicyclic structure as "HBA", ethyl carbitol acrylate as a monomer (a polymerizable compound) which does not have an alicyclic structure as "ECA", methoxy triethylene glycol acrylate as a monomer (a polymerizable compound) which does not have an alicyclic structure as "MTEGA", t-butyl acrylate as a monomer (a polymerizable compound) which does not have an alicyclic structure as "TBA", benzyl acrylate as a monomer (a polymerizable compound) which does not have an alicyclic structure as "BA", acrylic acid 2-(2-hydroxyethoxy) ethyl as a monomer (a polymerizable compound) which does not have an alicyclic structure as "VEEA", benzyl methacrylate as a monomer (a polymerizable compound) which does not have an alicyclic structure as "BM", urethane acrylate as a monomer (a polymerizable compound) which does not have an alicyclic structure as "UA", DISPERBYK-118 as a thixotropy suppressing agent (a phosphoric acid-based dispersing agent) as "T1", DISPERBYK-140 as a thixotropy suppressing agent (an amine-based dispersing agent) as "T2", polytetrafluoroethylene powder (volume average particle diameter ($D_{50}$): 51 nm, $D_{10}$: 11 nm, $D_{90}$: 89 nm, half-value width in particle distribution: 33 nm) as a thixotropy suppressing agent (fluorine-containing powder) as "T3", FA-200F (volume average particle diameter: 7.5 nm, surface free energy: 19 mN/m) as a dendritic polymer (a hyperbranched polymer) which contains a fluorine atom as a thixotropy suppressing agent (fluorine-containing powder) as "T4", DISPERBYK-110 as a thixotropy suppressing agent (a phosphoric acid-based dispersing agent) as "T5", DISPERBYK-102 as a thixotropy suppressing agent (a phosphoric acid-based dispersing agent) as "T6", Prisurf A212C as a thixotropy suppressing agent (a phosphoric acid-based dispersing agent) as "T7", the compound (the substance A) which is represented by Formula (9) described above as "A1", the compound (the substance A) which is represented by Formula (10) described below as "A2", the compound (the substance A) which is represented by Formula (11) described below as "A3", the substance A which is represented by Formula (12) described below as "A4", Irgacure 819 (produced by BASF Corp.) as "ic819", Speedcure TPO (produced by ACETO Corp.) as "scTPO", Speedcure DETX (produced by Lambson Ltd.) as "scDETX", BYK-350 (produced by BYK Japan K.K.) as "BYK 350", hydroquinone monomethyl ether as "MEHQ", LHP-96 (produced by Kusumoto Chemicals, Ltd.) as "LHP", LF-1982 (produced by Kusumoto Chemicals, Ltd.) as "LF-1", and LF-1984 (produced by Kusumoto Chemicals, Ltd.) as "LF-2". In addition, in the tables, regarding Example 15, regarding the composition of the constituent material of the base particles, the content ratio of each element is shown by weight ratio. In addition, Table 2 and Table 3 show the value of η2−η1 for the ultraviolet-curable compositions of each Example and Comparative Example when a viscosity η1 [mPa·s] at a shearing speed 1000 sec$^{-1}$ and a viscosity η2 [mPa·s] which is obtained by measuring in a state where the shearing speed is set as 10 sec$^{-1}$ after continuously adding shearing stress at a shearing speed 1000 sec$^{-1}$ for 10 minutes are set, the viscosity η0 in a state (in a default state which is previously measured by a vibration method or the like) before adding the shearing stress at a shearing speed of 1000 sec$^{-1}$, the value of η1−η0, and the value of η1/η0. In addition, the measurement of the viscosity described above is performed using a vibration-type viscometer (manufactured by A&D Company, Ltd., SV-10A) for the viscosity η0 in a default state and the measurement of the viscosities η1 and η2 which come along with shearing stress is performed using a rotational viscometer (manufactured by Anton Paar Japan K.K., Physica MCR-301). The environmental temperature when measuring the shearing speed is 20° C. in all cases. In addition, 10 arbitrary metal particles of each the metal powders forming the ultraviolet-curable composition in each of the Examples were observed, the ratio ($S_1/S_0$) was determined with respect to an area $S_1$ [μm²] when observed (when viewing in plan view) from the direction in which the projection area is the maximum and an area $S_0$ [μm²] when observed from a direction in which the area is the maximum when observing in the direction orthogonal to the observation direction, and the average value thereof was obtained, at which point the average values of $S_1/S_0$ were all 19 or more.

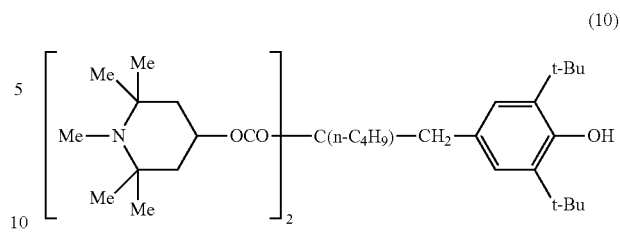

(10)

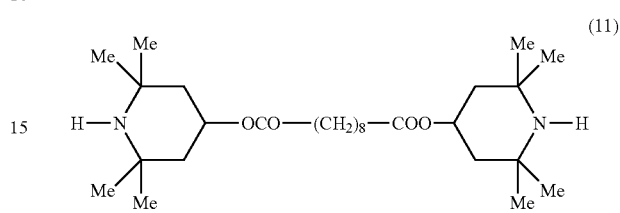

(11)

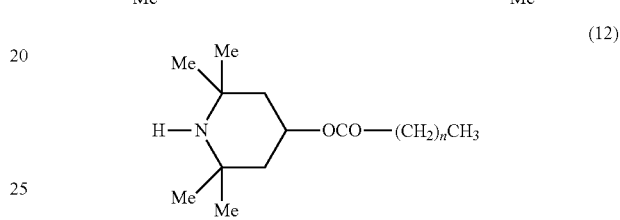

(12)

(Here, the substance A shown in Formula (12) is a mixture of a plurality of compounds in which n in the formula is 10 or more to 19 or less (the main component is a compound in which n in the formula is 15 or more to 18 or less).)

TABLE 1

| | | Metal powder | | | | | |
|---|---|---|---|---|---|---|---|
| | Shape | Constituent material of base particles | Material used in surface treatment | Volume average particle diameter [μm] | $D_{10}$ [μm] | $D_{90}$ [μm] | Half-value width [μm] | Average thickness [nm] |
| Example 1 | Flaky | Al | FAP1 | 0.45 | 0.28 | 0.77 | 0.32 | 20 |
| Example 2 | Flaky | Al | FAP1 | 0.45 | 0.28 | 0.77 | 0.32 | 20 |
| Example 3 | Flaky | Al | FAP1 | 0.76 | 0.45 | 1.36 | 0.84 | 20 |
| Example 4 | Flaky | Al | FAP1 | 0.95 | 0.51 | 1.75 | 1.12 | 80 |
| Example 5 | Flaky | Al | FAP1 | 0.95 | 0.51 | 1.75 | 1.12 | 80 |
| Example 6 | Flaky | Al | FAP1 | 0.79 | 0.44 | 1.36 | 0.86 | 60 |
| Example 7 | Flaky | Al | FAP1 | 0.79 | 0.44 | 1.36 | 0.86 | 60 |
| Example 8 | Flaky | Al | FAP1 | 0.45 | 0.28 | 0.77 | 0.32 | 20 |
| Example 9 | Flaky | Al | FAS1 | 0.46 | 0.28 | 0.78 | 0.32 | 20 |
| Example 10 | Flaky | Al | FAS2 | 0.48 | 0.29 | 0.82 | 0.32 | 20 |
| Example 11 | Flaky | Al | FAP1 | 0.63 | 0.39 | 1.10 | 0.63 | 30 |
| Example 12 | Flaky | Al | FAP1 | 0.69 | 0.41 | 1.13 | 0.77 | 40 |
| Example 13 | Flaky | Al | FAP1 | 0.63 | 0.38 | 1.19 | 0.63 | 30 |
| Example 14 | Flaky | Al | FAP1 | 0.42 | 0.25 | 0.68 | 0.30 | 15 |
| Example 15 | Flaky | Ni49.5Fe50.5 | LAP | 1.35 | 0.74 | 2.16 | 0.96 | 40 |
| Example 16 | Flaky | SUS316L | LEP | 1.65 | 0.89 | 2.58 | 1.23 | 50 |
| Example 17 | Flaky | Al | OTS | 2.16 | 1.18 | 3.51 | 1.91 | 20 |
| Example 18 | Flaky | Al | FFA1 | 0.52 | 0.32 | 0.86 | 0.33 | 20 |
| Example 19 | Flaky | Al | IS1 | 0.46 | 0.28 | 0.78 | 0.32 | 20 |
| Example 20 | Flaky | Al | AP1 | 0.46 | 0.28 | 0.78 | 0.32 | 20 |
| Comparative Example 1 | Flaky | Al | FAP1 | 0.45 | 0.28 | 0.77 | 0.32 | 20 |
| Comparative Example 2 | Flaky | Al | FAP1 | 0.45 | 0.28 | 0.77 | 0.32 | 20 |
| Comparative Example 3 | Flaky | Al | FAP1 | 0.45 | 0.28 | 0.77 | 0.32 | 20 |
| Comparative Example 4 | Flaky | Al | FAP1 | 0.45 | 0.28 | 0.77 | 0.32 | 20 |

TABLE 1-continued

| | | Fluorine-containing powder | | | |
| --- | --- | --- | --- | --- | --- |
| | | Shape | Constituent material of base particles | Material used in surface treatment | Volume average particle diameter [nm] |
| | Example 1 | Sphere | FA-1 | — | 7 |
| | Example 2 | Sphere | FE-1 | — | 10 |
| | Example 3 | Sphere | FMP-1 | — | 22 |
| | Example 4 | Sphere | Silica | FAS1 | 36 |
| | Example 5 | Sphere | Alumina | FAS1 | 30 |
| | Example 6 | Sphere | Silica | FAS2 | 36 |
| | Example 7 | Sphere | Alumina | FAS2 | 30 |
| | Example 8 | Sphere | Titania Al(OH)$_3$ | FFA1 | 27 |
| | Example 9 | Sphere | Talc | FAS1 | 26 |
| | Example 10 | Sphere | Talc | FAS2 | 26 |
| | Example 11 | Sphere | Al(OH)$_3$ | FFA1 | 29 |
| | Example 12 | Sphere | Al(OH)$_3$ | FAP1 | 29 |
| | Example 13 | Sphere | Iron oxide | FAP1 | 26 |
| | Example 14 | Sphere | Carbon Ca | FFA1 | 21 |
| | Example 15 | Sphere | PTFE | — | 43 |
| | Example 16 | Sphere | Silica | FAS1 | 36 |
| | Example 17 | Sphere | Titania | FFA1 | 31 |
| | Example 18 | Sphere | Silica | FAS2 | 36 |
| | Example 19 | Sphere | Al(OH)$_3$ | FFA1 | 29 |
| | Example 20 | Sphere | Silica | IS1 | 36 |
| | Comparative Example 1 | — | — | — | — |
| | Comparative Example 2 | Sphere | FA-1 | — | 1 |
| | Comparative Example 3 | Sphere | PTFE | — | 55 |
| | Comparative Example 4 | Sphere | FA-1 | — | 7 |

TABLE 2

| | Metal powder Content ratio [parts by mass] | Polymerizable compound | Content ratio [parts by mass] | Thixotropy suppressing agent | Content ratio [parts by mass] | Substance A | Content ratio [parts by mass] |
| --- | --- | --- | --- | --- | --- | --- | --- |
| Example 1 | 1.5 | AMO/PEA/THFA | 50.9/20.0/16.9 | T1 | 0.5 | A1 | 0.2 |
| Example 2 | 1.5 | AMO/THFA | 41.2/44.1 | T1 | 2.0 | A1 | 0.8 |
| Example 3 | 1.5 | AMO/THFA | 41.6/44.5 | T2 | 1.2 | A1 | 0.8 |
| Example 4 | 3.0 | BLA/THFM/TAOEI/DCPTeOEA/AA/PEA/DPGDA | 55.3/5.0/2.8/11.0/5.0/3.9/3.9 | T1 | 1.0 | A3 | 0.7 |
| Example 5 | 1.3 | AM/PMPM/TMPM/MAM/EAM/DCPTeA/AMO/TPGDA/VEEA | 3.8/7.8/3.0/3.0/3.1/3.2/58.8/1.2/2.0 | T3 | 1.2 | A4 | 1.2 |
| Example 6 | 5.0 | DCPTeOEM/MLM/DMTCDDA/AMO/TBA/CHM/PEA/HPPA | 3.4/3.4/2.4/41.9/8.6/8.4/9.9/4.9 | T4 | 0.7 | A1 | 1.0 |
| Example 7 | 2.0 | DMDCPTA/DCPTeM/DCPTaM/IBM/CHA/PEA/BA/AMO | 2.0/4.5/5.5/5.9/2.6/4.0/17.0/45.0 | T1 | 1.0 | A1 | 0.5 |
| Example 8 | 1.5 | BLA/AMO/PEA/HBA/THFA | 29.6/35.6/9.7/8.2/3.2 | T1 | 1.0 | A2 | 0.8 |
| Example 9 | 1.5 | BLA/AMO/VC/VP | 25.1/35.0/7.2/19.3 | T5 | 0.3 | A1 | 1.4 |
| Example 10 | 1.5 | BLA/AMO/TBA/VEEA/UA | 27.4/33.1/4.8/9.5/12.5 | T5 | 0.4 | A1 | 0.4 |
| Example 11 | 1.5 | BLA/AMO/VP/PEA/BLM | 33.1/35.3/3.5/13.9/3.0 | T6 | 0.5 | A3 | 0.8 |
| Example 12 | 1.5 | BLA/AMO/VEEA/BM/UA | 28.0/25.9/10.2/17.0/10.3 | T6 | 0.5 | A1 | 0.2 |

TABLE 2-continued

|  | | Other components | | | | |
|---|---|---|---|---|---|---|
|  | | Content ratio [parts by mass] | $\eta2 - \eta1$ [mPa·s] | $\eta0$ [mPa·s] | $\eta1 - \eta0$ [mPa·s] | $\eta1/\eta0$ |
| Example 1 | ic819/scTPO/scDETX/LF-1 | 4.0/4.0/1.0/1.0 | 0.2 | 6.9 | 3.3 | 1.04 |
| Example 2 | ic819/scTPO/scDETX/LHP/LF-2 | 4.0/4.0/0.4/1.0/1.0 | 0.2 | 5.8 | 0.3 | 1.05 |
| Example 3 | ic819/scTPO/scDETX/LHP/LF-2 | 4.0/4.0/0.4/1.0/1.0 | 0.3 | 5.8 | 0.2 | 1.03 |
| Example 4 | ic819/scTPO/BYK350/MEHQ | 4.0/4.0/0.2/0.2 | 0.5 | 7.8 | 0.5 | 1.06 |
| Example 5 | ic819/scTPO/scDETX/BYK350/MEHQ | 4.0/4.0/0.4/1.5/0.5 | 0.6 | 9.2 | 1.0 | 1.11 |
| Example 6 | ic819/scTPO/scDETX/BYK350/MEHQ | 4.0/4.0/0.4/1.5/0.5 | 1.3 | 9.7 | 0.6 | 1.06 |
| Example 7 | ic819/scTPO/scDETX/LF-2 | 4.0/4.0/1.0/1.0 | 0.3 | 7.3 | 0.6 | 1.08 |
| Example 8 | ic819/scTPO/scDETX/BYK350/MEHQ | 4.0/4.0/0.4/1.5/0.5 | 1.2 | 7.2 | 0.5 | 1.07 |
| Example 9 | ic819/scTPO/scDETX/LHP/LF-2 | 4.0/4.0/0.2/1.0/1.0 | 1.8 | 5.1 | 0.6 | 1.12 |
| Example 10 | ic819/scTPO/scDETX/BYK350/MEHQ | 4.0/4.0/0.4/1.5/0.5 | 0.4 | 6.9 | 0.7 | 1.10 |
| Example 11 | ic819/scTPO/LHP/LF-2 | 4.0/4.0/0.2/0.2 | 0.2 | 7.2 | 0.3 | 1.04 |
| Example 12 | ic819/scTPO/LF-2/MEHQ | 4.0/2.0/0.2/0.2 | 0.15 | 6.0 | 0.2 | 1.03 |

TABLE 3

|  | Metal powder Content ratio [parts by mass] | Polymerizable compound | Content ratio [parts by mass] | Thixotropy suppressing agent | Content ratio [parts by mass] | Substance A | Content ratio [parts by mass] |
|---|---|---|---|---|---|---|---|
| Example 13 | 2.0 | AMO/THFA/PEA | 34.5/31.6/20.1 | T7 | 0.2 | A4 | 1.2 |
| Example 14 | 2.0 | DAI/TAI/ECA/MTEGA/IBA/BA | 2.3/2.2/17.6/15.1/5.9/42.5 | T7 | 1.0 | A1 | 1.0 |
| Example 15 | 2.0 | AMO/THFA/BA/VEEA/UA | 28.8/27.1/14.6/11.3/4.0 | T1 | 1.0 | A2 | 0.8 |
| Example 16 | 2.0 | AMO/THFA/VEEA/BM/MEDOLA | 27.7/28.6/11.0/15.3/4.0 | T1 | 1.0 | A1 | 0.2 |
| Example 17 | 2.5 | AMO/THFA/BM | 52.0/30.0/4.5 | T5 | 0.3 | A2 | 0.3 |
| Example 18 | 1.5 | AMO/THFA/BA | 41.0/39.4/6.9 | T6 | 0.5 | A2 | 0.3 |
| Example 19 | 1.5 | AMO/BA/DCPTaA/CHDOLA | 34.0/21.2/16.0/16.1 | T7 | 0.5 | A2 | 0.3 |
| Example 20 | 1.5 | AMO/THFA | 52.2/33.9 | T1 | 1.0 | A1 | 1.0 |
| Comparative Example 1 | 1.5 | AMO/PEA/THFA | 51.0/20.4/16.9 | — | — | A1 | 0.2 |
| Comparative Example 2 | 1.5 | AMO/PEA/THFA | 48.5/19.4/16.9 | T6 | 3.5 | A1 | 0.2 |

|  | | Other components | | | | |
|---|---|---|---|---|---|---|
|  | | Content ratio [parts by mass] | $\eta2 - \eta1$ [mPa·s] | $\eta0$ [mPa·s] | $\eta1 - \eta0$ [mPa·s] | $\eta1/\eta0$ |
| Example 13 | ic819/scTPO/scDETX/LF-2/MEHQ | 4.0/4.0/2.0/0.2/0.2 | 2.7 | 5.6 | 0.9 | 1.16 |
| Example 14 | ic819/scTPO/scDETX/BYK350/MEHQ | 4.0/4.0/2.0/0.2/0.2 | 0.4 | 4.8 | 0.4 | 1.08 |
| Example 15 | ic819/scTPO/scDETX/LHP/MEHQ | 4.0/4.0/2.0/0.2/0.2 | 0.3 | 4.7 | 0.1 | 1.02 |
| Example 16 | ic819/scTPO/scDETX/LHP | 4.0/4.0/2.0/0.2 | 0.4 | 7.4 | 0.5 | 1.07 |
| Example 17 | ic819/scTPO/scDETX/LHP/LF-1 | 4.0/4.0/2.0/0.2/0.2 | 0.7 | 5.6 | 0.3 | 1.05 |

TABLE 3-continued

|  |  |  |  |  |  |  |
|---|---|---|---|---|---|---|
| Example 18 | ic819/scTPO/scDETX/LHP/LF-1 | 4.0/4.0/2.0/0.2/0.2 | 0.2 | 4.8 | 0.1 | 1.02 |
| Example 19 | ic819/scTPO/scDETX/LHP/LF-1 | 4.0/4.0/2.0/0.2/0.2 | 0.6 | 7.4 | 0.3 | 1.04 |
| Example 20 | ic819/scTPO/scDETX/LHP/LF-1 | 4.0/4.0/2.0/0.2/0.2 | 1.0 | 5.6 | 0.5 | 1.09 |
| Comparative Example 1 | ic819/scTPO/scDETX/LF-1 | 4.0/4.0/1.0/1.0 | 12.5 | 7.5 | 2.5 | 1.33 |
| Comparative Example 2 | ic819/scTPO/scDETX/LF-1 | 4.0/4.0/1.0/1.0 | 13.3 | 7.4 | 1.8 | 1.24 |

2. Discharge Stability of Ultraviolet-Curable Composition

Firstly, a liquid droplet discharging apparatus installed in a chamber (thermal chamber) and the compositions for producing the recorded matter in each of the Examples and Comparative Examples were prepared and, in a state where the driving waveforms of piezoelectric elements were optimized, at a voltage 3 V higher than the use voltage, and in an environment of 25° C. and 50% RH, the discharge average speed of the liquid droplets and the weight of ink for each of the compositions for producing the recorded matter were measured beforehand while carrying out continuous discharge at a frequency of 20 kHz from each nozzle of a liquid droplet discharging head of which the size of the nozzle hole has a diameter of 22 m. Next, the situation at the time when continuous discharge of 1,000,000 liquid droplets (1,000,000 droplets) from each nozzle was performed was taken in to a computer as an imaging image and the defective nozzles (the total number of nozzles which did not normally discharge, such as discharge speed decreases or the like which accompanies omissions, discharge bending, ink weight changes, and the like) were acquired and counted. The omissions in this case indicate a state where the liquid droplets did not come out from the nozzle holes or abnormal emissions were caused in a spray form, additionally, the discharge bending indicates a state of flying bending in a range of ±5 degrees or more with respect to a normal state where discharge is carried out in the normal direction of a nozzle surface. For the reduction of the discharge speed, a nozzle is calculated as a defective nozzle when the speed is reduced by 3% or more with respect to the discharge average speed calculated beforehand. When the probability of the generation (the ratio of defect nozzles with respect to the total number of evaluated nozzles) of defective nozzles is small, the discharge stability can be determined as high.

2.1. Bending Failure Generation Rate

A: Bending failure generation probability is less than 0.5%

B: Bending failure generation probability is 0.5% or more and less than 1.0%

C: Bending failure generation probability is 1.0% or more and less than 5.0%

D: Bending failure generation probability is 5.0% or more and less than 10.0%

E: Bending failure generation probability is 10.0% or more 2.2. Omission Failure Generation Rate (Discharge Omission)

A: Omission failure generation probability is less than 0.5%

B: Omission failure generation probability is 0.5% or more and less than 1.0%

C: Omission failure generation probability is 1.0% or more and less than 2.0%

D: Omission failure generation probability is 2.0% or more and less than 5.0%

E: Omission failure generation probability is 5.0% or more

3. Storage Stability Evaluation (Long Term Stability Evaluation) of Ultraviolet-Curable Composition 3.1. Dispersibility The ultraviolet-curable compositions in each Example and Comparative Example, were left in an environment of 40° C. for 60 days, then 1 L thereof was passed through a capsule filter (manufactured by Yamashin-Filter Corp.) with a filtration precision of 3 μm, the mass concentrations of the metal powder in the ultraviolet-curable composition before and after the passing were measured, the loss due to the filtering of rough particles caused by insufficient dispersion was determined using the mass concentration reduction ratio, and evaluation thereof was carried out according to the criteria below.

A: Ink concentration reduction ratio is less than 5%

B: Ink concentration reduction ratio is 5% or more and less than 10%

C: Ink concentration reduction ratio is 10% or more and less than 20%

D: Ink concentration reduction ratio is 20% or more and less than 40%

E: Ink concentration reduction ratio is 40% or more 3.2. Increase Ratio of Viscosity The ultraviolet-curable compositions in each Example and Comparative Example were left in an environment of 60° C. for 20 days, then the viscosity at 25° C. of the ultraviolet-curable composition in each Example measured on the basis of JIS Z8809 was measured using a vibration-type viscometer, the increase ratio of the viscosity directly after being produced was determined, and evaluation thereof was carried out according to the criteria below.

A: Viscosity increase ratio is less than 5%

B: Viscosity increase ratio is 5% or more and less than 10%

C: Viscosity increase ratio is 10% or more and less than 18%

D: Viscosity increase ratio is 18% or more and less than 23%

E: Viscosity increase ratio is 23% or more, or the generation of foreign matter is confirmed 4. Producing Recorded Matter Using the ultraviolet-curable compositions in each Example and Comparative Example, interior panels were respectively produced as the recorded matter as described below.

Firstly, the ultraviolet-curable composition was inserted in an ink jet apparatus.

After that, the ultraviolet-curable composition was discharged onto a substrate (a recording medium), which had a curved surface portion formed using polycarbonate (produced by Asahi Glass Co., Ltd., carbo glass, polish, 2 mm thickness), in a predetermined pattern. The liquid droplet discharge was performed in a state where the driving waveforms of the piezoelectric elements were optimized, at a specified voltage (28 V), in an environment of 25° C. and 50% RH, and in a state where the vibration frequency (frequency) of the piezoelectric elements was 16 kHz.

After that, ultraviolet rays with a spectrum which had maximum values in the wavelengths of 365 nm, 380 nm, and 395 nm were irradiated at an irradiation intensity of 160 mW/cm$^2$ for 10 seconds and the ultraviolet-curable compositions on the substrate were cured. After that, heating was carried out at 80° C. for one hour and interior panels were obtained as a recorded matter.

Using the method described above, each of the 10 interior panels (recorded matter) was produced using the ultraviolet-curable compositions in each Example and Comparative Example.

In addition, the 10 interior panels (recorded matter) were each produced using the ultraviolet-curable compositions in each Example and Comparative Example in the same manner as described above apart from using a substrate formed using polyethylene terephthalate (produced by Mitsubishi Plastics Inc., Diafoil G440E, 38 μm thickness), a substrate formed using a low density polyethylene (produced by Mitsui Chemicals Tohcello. Inc., T.U.X (L-LDPE) HC-E #80), a substrate formed using biaxial-stretched polypropylene (produced by Mitsui Chemicals Tohcello. Inc., OP U-1 #60), and a substrate formed using hard vinyl chloride (produced by Acrysunday Co., Ltd. Sunday sheet (transparent), 0.5 mm thickness), as the substrate.

5. Evaluation of Recorded Matter

Each recorded matter which was obtained as described above was evaluated as follows.

5.1. Appearance Evaluation of Recorded Matter

Each recorded matter which was produced in each Example and Comparative Example was visually observed and evaluated according to the criteria of the 7 stages below.

A: Having glossiness with a full sense of luxury and having an extremely excellent appearance B: Having glossiness with a full sense of luxury and having a very excellent appearance C: Having glossiness with a full sense of luxury and having an excellent appearance D: Having glossiness with a full sense of luxury and having a favorable appearance E: Glossiness is poor and the appearance is slightly defective F: Glossiness is poor and the appearance is defective G: Glossiness is poor and the appearance is extremely defective 5.2. Glossiness Level For the pattern forming portions of each recorded matter produced in each Example and Comparative Example, the glossiness level at a flap angle of 600 was measured using a gloss meter (MINOLTA MULTI GLOSS 268) and evaluated according to the criteria below.

A: Glossiness level is 320 or more

B: Glossiness level is 250 or more and less than 320

C: Glossiness level is 150 or more and less than 250

D: Glossiness level is less than 150

5.3. Abrasion Resistance

On the basis of JIS L0849, 48 hours after producing the recorded matter, loads of 500 g of the recorded matter according to each Example and Comparative Example were mounted in a fastness test apparatus and cloth rubbing was performed thereon 30 times, the glossiness level (at a flap angle 60°) of the recorded matter after the cloth rubbing was also measured with the same method as the description 5.2. described above, the decrease ratio of the glossiness level before and after the cloth rubbing was obtained, and evaluation thereof was carried out according to the criteria below.

A: Glossiness level decrease ratio is less than 10%

B: Glossiness level decrease ratio is 10% or more and less than 20%

C: Glossiness level decrease ratio is 20% or more and less than 30%

D: Glossiness level decrease ratio is 30% or more and less than 50%

E: Glossiness level decrease ratio is 50% or more

The results are shown in Table 4. Here, in Table 4, the recorded matter produced using a substrate made of polycarbonate is shown as "M1", the recorded matter produced using a substrate made of polyethylene terephthalate as "M2", the recorded matter produced using a substrate made of low density polyethylene as "M3", the recorded matter produced using a substrate made of biaxial-stretched polypropylene as "M4", and the recorded matter produced using a substrate made of hard vinyl chloride as "M5".

TABLE 4

| | Discharge bending | Discharge omissions | Storage stability | | Appearance of recorded matter | | | | | Glossiness | | | | | Abrasion resistance | | | | |
|---|---|---|---|---|---|---|---|---|---|---|---|---|---|---|---|---|---|---|---|
| | | | Dispersibility | Increase ratio of viscosity | M1 | M2 | M3 | M4 | M5 | M1 | M2 | M3 | M4 | M5 | M1 | M2 | M3 | M4 | M5 |
| Example 1 | A | A | A | A | A | A | A | B | A | A | A | A | A | B | B | B | B | B | B |
| Example 2 | A | A | A | A | A | A | B | B | A | A | A | A | B | A | B | B | B | C | B |
| Example 3 | B | B | A | A | A | A | B | C | B | B | B | B | C | B | B | B | C | C | B |
| Example 4 | C | C | A | B | A | B | B | B | A | B | C | C | C | A | A | A | B | B | A |
| Example 5 | B | C | A | B | B | B | B | B | A | C | C | C | C | C | B | B | B | B | A |
| Example 6 | C | C | A | B | B | B | B | C | B | C | C | C | C | C | A | B | B | B | A |
| Example 7 | A | B | A | B | A | B | B | B | B | C | C | C | C | C | A | B | B | B | A |
| Example 8 | A | B | A | B | A | B | B | C | B | B | B | C | C | B | A | B | B | B | B |
| Example 9 | A | A | A | C | B | B | C | B | B | A | A | B | B | A | B | A | A | B | B |
| Example 10 | A | B | A | B | B | B | B | B | B | B | B | C | C | B | A | A | B | A | A |
| Example 11 | A | B | A | C | B | B | B | B | B | B | B | B | B | B | B | B | B | B | B |
| Example 12 | A | A | A | A | B | B | B | C | B | B | B | B | B | B | B | B | B | B | B |
| Example 13 | B | A | B | B | B | B | C | C | B | A | A | B | B | A | B | B | B | C | B |
| Example 14 | A | A | B | B | B | C | B | B | B | B | C | C | B | B | B | B | B | B | B |
| Example 15 | B | C | B | B | A | A | B | C | B | C | C | C | C | B | B | B | B | B | B |
| Example 16 | C | C | A | A | B | B | C | C | B | C | C | C | C | B | A | B | B | C | B |
| Example 17 | B | C | B | B | B | B | C | C | C | B | B | C | C | B | B | B | B | C | B |

TABLE 4-continued

| | Discharge bending | Discharge omissions | Storage stability | | Appearance of recorded matter | | | | | Glossiness | | | | | Abrasion resistance | | | | |
|---|---|---|---|---|---|---|---|---|---|---|---|---|---|---|---|---|---|---|---|
| | | | Dispersibility | Increase ratio of viscosity | M1 | M2 | M3 | M4 | M5 | M1 | M2 | M3 | M4 | M5 | M1 | M2 | M3 | M4 | M5 |
| Example 18 | B | B | A | A | A | A | A | B | A | B | A | B | B | A | B | B | B | C | B |
| Example 19 | C | C | A | A | A | A | B | A | A | A | B | B | B | B | A | A | B | B | A |
| Example 20 | A | A | A | A | A | A | A | B | A | A | A | B | B | A | B | B | B | C | B |
| Comparative Example 1 | C | D | A | A | C | C | E | E | D | B | B | B | B | B | B | C | D | D | B |
| Comparative Example 2 | E | E | C | E | E | E | E | E | E | D | D | D | D | C | B | C | D | D | B |

As is clear from Table 4, the composition (the ultraviolet-curable composition) of the invention is excellent in the liquid droplet discharge stability. In addition, the composition (the ultraviolet-curable composition) of the invention is also excellent in the storage stability. In addition, the recorded matter of the invention has excellent glossiness and appearance and is also excellent in the abrasion resistance of the pattern forming portion. In addition, by using the composition (the ultraviolet-curable composition) of the invention, excellent results were stably obtained regardless of the type of the recording medium. In contrast, satisfactory results were not obtained with the Comparative Examples.

The entire disclosure of Japanese Patent Application No. 2015-224702, filed Nov. 17, 2015 is expressly incorporated by reference herein.

What is claimed is:

1. An ultraviolet-curable composition which is discharged with an inkjet method, the ultraviolet-curable composition comprising:
   a polymerizable compound;
   a metal powder subjected to a surface treatment using a fluorine-based surface treatment agent, a content of the metal powder in the ultraviolet-curable composition being 0.9 mass % to 29 mass %; and
   a thixotropy suppressing agent containing a phosphoric acid-based dispersing agent,
   wherein a relationship of $\eta2-\eta1 \leq 3$ is satisfied between a viscosity $\eta1$ [mPa·s] at a shearing speed of 1000 sec$^{-1}$ and a viscosity $\eta2$ [mPa·s] which is determined by measuring in a state where the shearing speed is 10 sec$^{-1}$ after continuing to add shearing stress for 10 minutes at the shearing speed of 1000 sec$^{-1}$.

2. The ultraviolet-curable composition according to claim 1,
   wherein the thixotropy suppressing agent further includes at least one of an alkyl amine-based dispersing agent and a fluorine-containing powder.

3. The ultraviolet-curable composition according to claim 1,
   wherein the content of the thixotropy suppressing agent in the ultraviolet-curable composition is 0.2 mass % to 2.0 mass %.

4. The ultraviolet-curable composition according to claim 1, wherein the fluorine-based surface treatment agent is at least one selected from the group comprising a fluorine-based silane compound, a fluorine-based phosphate compound, a fluorine-substituted fatty acid, and a fluorine-based isocyanate compound.

5. The ultraviolet-curable composition according to claim 1,
   wherein the average particle diameter of the metal powder is 200 nm to 3.0 μm.

6. The ultraviolet-curable composition according to claim 1,
   wherein the metal powder includes constituent particles where at least a surface thereof includes Al.

7. The ultraviolet-curable composition according to claim 1,
   wherein the constituent particles of the metal powder are flaky.

8. The ultraviolet-curable composition according to claim 7,
   wherein an average thickness of the constituent particles of the metal powder is 10 nm to 80 nm.

9. The ultraviolet-curable composition according to claim 1,
   wherein a monomer having an alicyclic structure is included as the polymerizable compound.

10. The ultraviolet-curable composition according to claim 9,
    wherein the monomer having the alicyclic structure includes at least one selected from a group comprising tris(2-acryloyloxyethyl) isocyanurate, dicyclopentenyloxyethyl acrylate, adamantyl acrylate, γ-butyrolactone acrylate, N-vinylcaprolactam, N-vinylpyrrolidone, pentamethylpiperidyl acrylate, tetramethyl piperidyl acrylate, 2-methyl-2-adamantyl acrylate, 2-ethyl-2-adamantyl acrylate, mevalonic lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloylmorpholine, tetrahydrofurfuryl acrylate, cyclohexane spiro-2-(1,3-dioxolan-4-yl) methyl acrylate, and (2-methyl-2-ethyl-1,3-dioxolan-4-yl) methyl acrylate.

11. The ultraviolet-curable composition according to claim 1,
    wherein the polymerizable compound is at least one monomer selected from a group comprising phenoxyethyl acrylate, benzyl acrylate, 2-(2-vinyloxyethoxy) ethyl acrylate, dipropylene glycol diacrylate, tripropylene glycol diacrylate, 2-hydroxy 3-phenoxypropyl acrylate, and 4-hydroxybutyl acrylate.

12. Recorded matter comprising:
    a cured product of the ultraviolet-curable composition according to claim 1; and
    a recording medium.

13. Recorded matter comprising:
    a cured product of the ultraviolet-curable composition according to claim 2; and
    a recording medium.

14. Recorded matter comprising:
    a cured product of the ultraviolet-curable composition according to claim 3; and
    a recording medium.

15. Recorded matter comprising:
a cured product of the ultraviolet curable composition according to claim 4; and
a recording medium.

16. Recorded matter comprising:
a cured product of the ultraviolet-curable composition according to claim 5; and
a recording medium.

17. The ultraviolet-curable composition according to claim 1, wherein the fluorine-based surface treatment agent includes a flourine-based phosphate compound, a flourine-substituted fatty acid, and a flourine-based isocyanate compound.

18. The ultraviolet-curable composition according to claim 1, further comprising a substance A which has a partial structure which is shown by Formula (8):

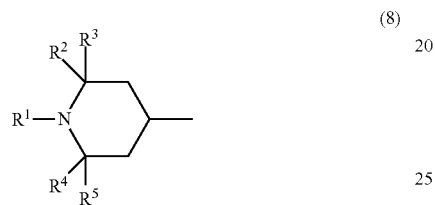

(8)

where R1 indicates an oxygen atom, a hydrogen atom, a hydrocarbon group, or an alkoxyl group and R2, R3, R4, and R5 each independently indicate a hydrogen atom or a hydrocarbon group.

* * * * *